(12) United States Patent
Yoshida

(10) Patent No.: US 8,136,086 B2
(45) Date of Patent: *Mar. 13, 2012

(54) CONTROL METHOD FOR APPARATUS CAPABLE OF USING MACROS DESCRIBING OPERATION SEQUENCE

(75) Inventor: Hiroyoshi Yoshida, Ohta-ku (JP)

(73) Assignee: Canon Kabushiki Kaisha (JP)

( * ) Notice: Subject to any disclaimer, the term of this patent is extended or adjusted under 35 U.S.C. 154(b) by 1630 days.

This patent is subject to a terminal disclaimer.

(21) Appl. No.: 11/214,008

(22) Filed: Aug. 29, 2005

(65) Prior Publication Data

US 2006/0044587 A1 Mar. 2, 2006

(30) Foreign Application Priority Data

Aug. 27, 2004 (JP) .............................. 2004-248665

(51) Int. Cl.
*G06F 9/44* (2006.01)
(52) U.S. Cl. ........................................................ 717/101
(58) Field of Classification Search ........... 717/100–105
See application file for complete search history.

(56) References Cited

U.S. PATENT DOCUMENTS

| | | | |
|---|---|---|---|
| 5,566,336 A | 10/1996 | Futatsugi et al. | |
| 6,292,445 B1 * | 9/2001 | Ito et al. | 369/47.14 |
| 7,027,710 B2 * | 4/2006 | Koike et al. | 386/52 |

FOREIGN PATENT DOCUMENTS

| | | |
|---|---|---|
| JP | 6-274329 A | 9/1994 |
| JP | 11-085692 A | 3/1999 |
| JP | 2000-222100 A | 8/2000 |
| JP | 2001-127929 A | 5/2001 |

OTHER PUBLICATIONS

Euliano, "Manual for the use if the HP Designjet 815mfp", Aug. 3, 2004, North Carolina State University, 53 pages.*
HP Invent, "Hp LaserJet 9055mfp/9065mfp—Field Service Handbook", Nov. 2003, Hewlett-Packard Development Company, 253 pages.*
Notification of Reason for Refusal issued in corresponding Japanese Patent Application No. 2004-248665 dated Sep. 8, 2009 (English translation only is provided).

* cited by examiner

*Primary Examiner* — Ted T Vo
(74) *Attorney, Agent, or Firm* — Rossi, Kimms & McDowell LLP

(57) ABSTRACT

A multi function peripheral (MFP) is provided with a scanner and a printer for operating a copy function, and a macro control unit and macro function unit for operating a macro function in order to reliably operating the macro function even for an event generated asynchronously with a user operation. The macro control unit manages pairs of user operations and events generated by the user operations. The macro function executes a record process of generating a macro file constituted of a plurality of scripts from user operations and a reproduce process of reproducing the user processes. A script corresponding to an event of waiting for execution completion of a copy job is recorded in the macro file at a row next to the row at which a copy start script is written.

10 Claims, 30 Drawing Sheets

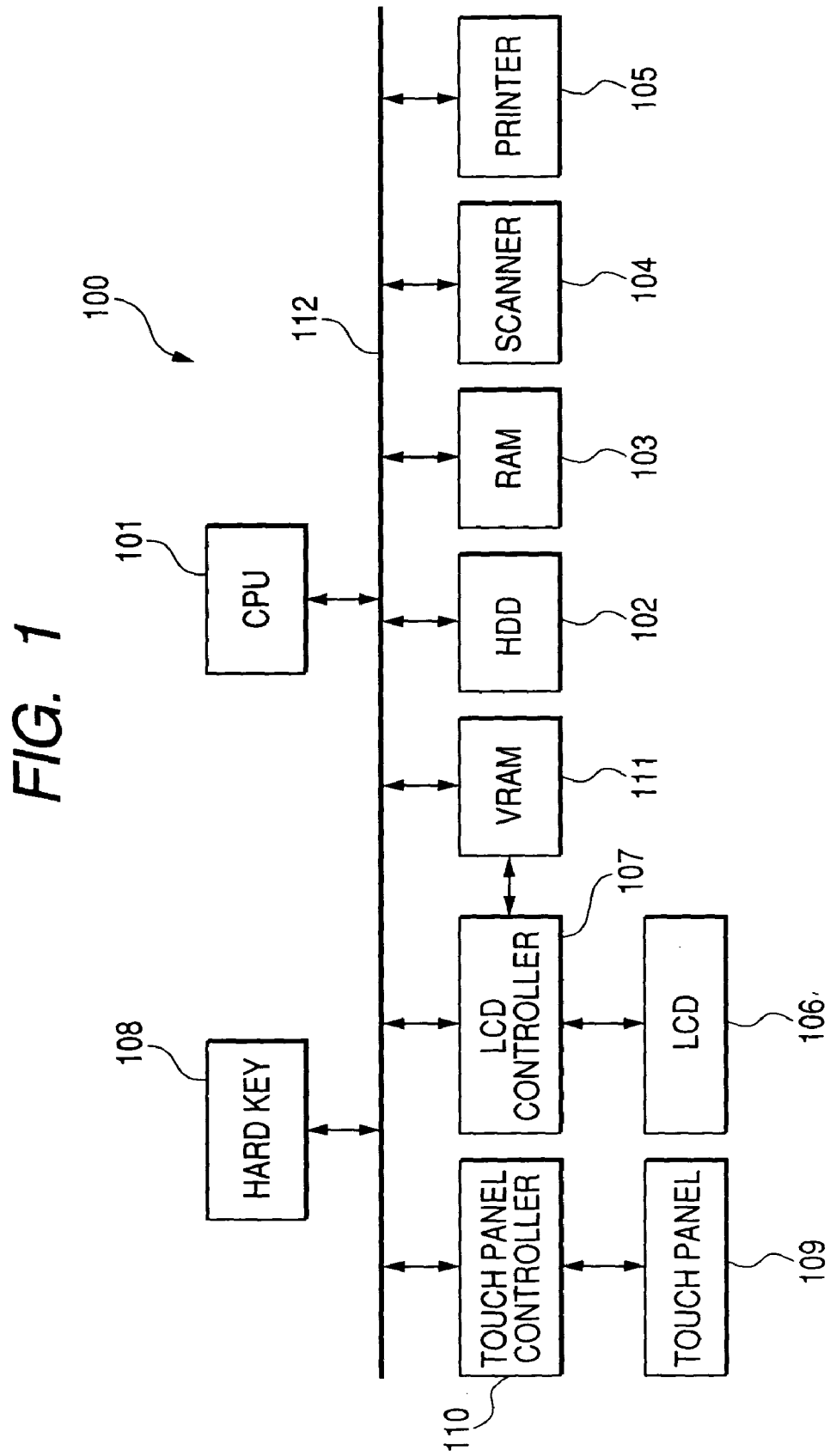

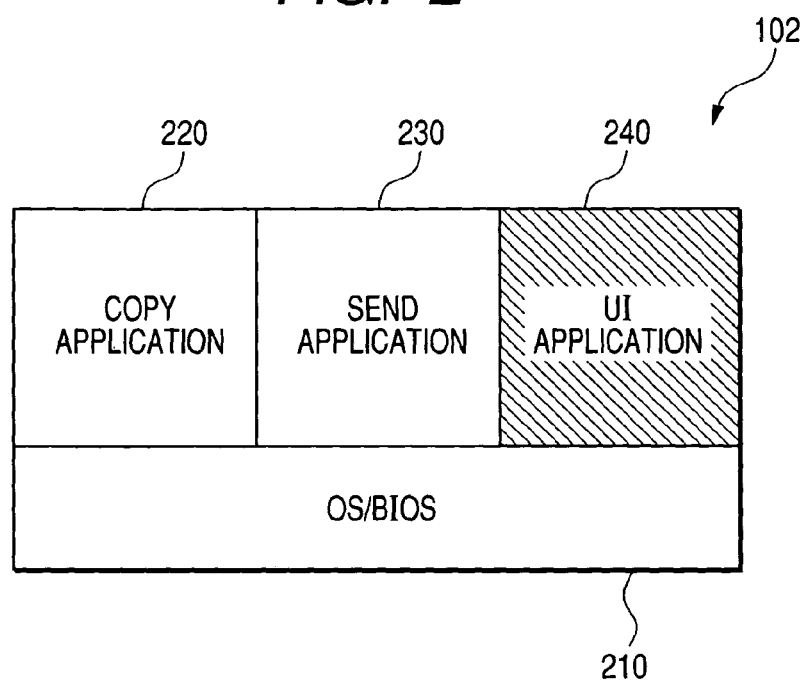
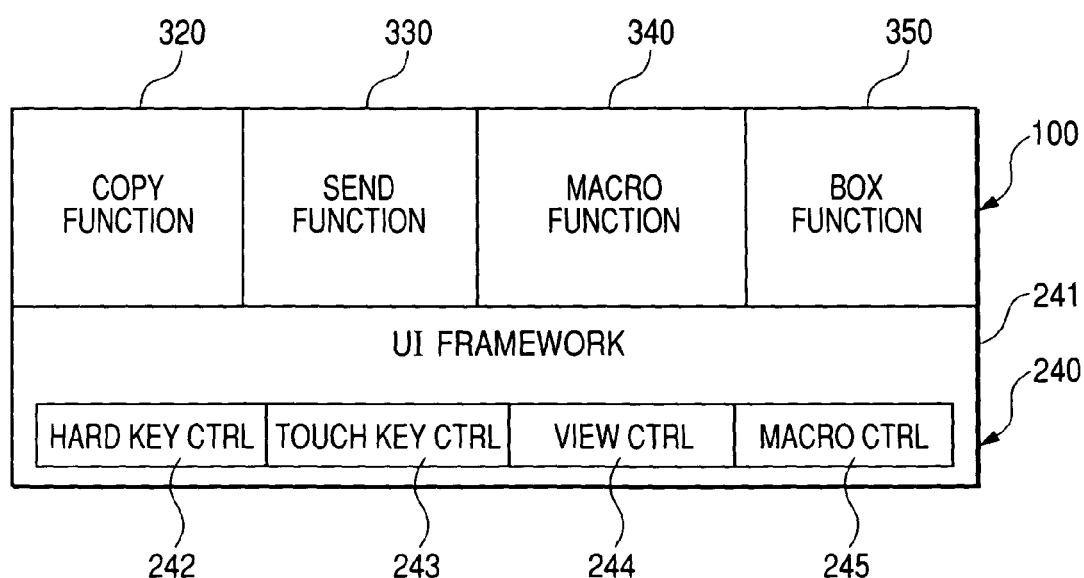

FIG. 7

```
0001: import ("jmmf.macro.*")
0002: push ("function_copy","class_none","instace_none")
0003: push ("function_copy","class_base","instace_sorter")
0004: push ("function_copy","class_sorter","instace_sort")
0005: push ("function_copy","class_sorter","instace_ok")
0006: push ("function_copy","class_base","instace_special")
0007: push ("function_copy","class_special","instace_Nin1")
0008: push ("function_copy","class_special_Nin1","instace_docDup")
0009: push ("function_copy","class_special_Nin1_docDup","instace_ok")
0010: push ("function_copy","class_special_Nin1","instace_next")
0011: push ("function_copy","class_special_Nin1_layout","instace_4in1")
0012: push ("function_copy","class_special_Nin1_layout","instace_prntDup")
0013.: push ("function_copy","class_special_Nin1_prntDup","instace_ok")
0014: push ("function_copy","class_special","instace_close")
0015: push ("function_copy","class_base","instace_start")
0016: wait ("function_copy","class_job","status_complete")
0017: push ("function_send","class_none","instace_none")
0018: push ("function_send","class_base","instace_start")
0019: quit ( )
```

FIG. 8

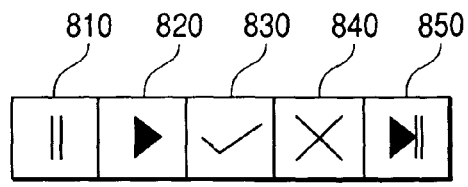

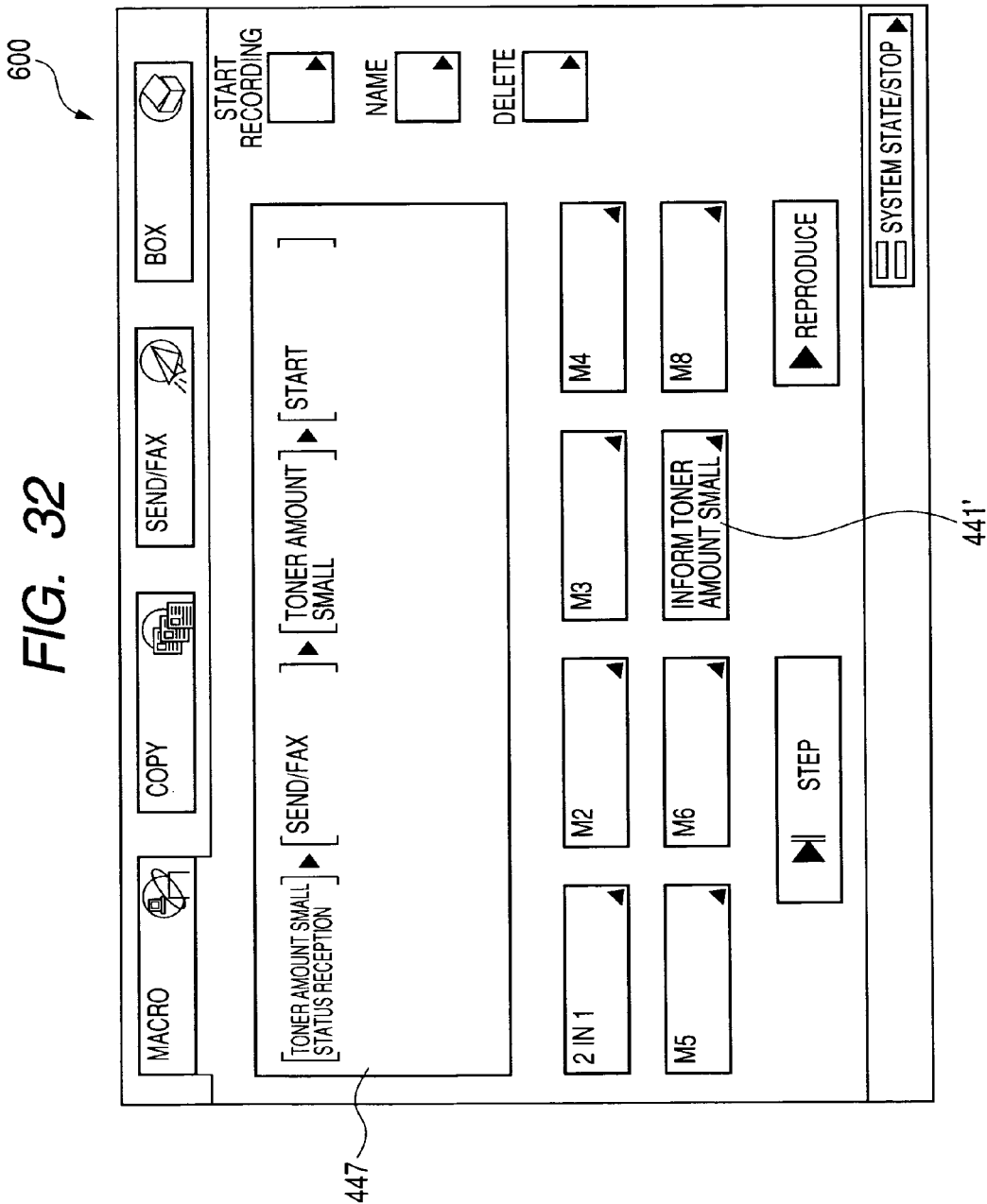

CONTROL METHOD FOR APPARATUS CAPABLE OF USING MACROS DESCRIBING OPERATION SEQUENCE

BACKGROUND OF THE INVENTION

1. Field of the Invention

The present invention relates to an apparatus for executing macros realizing a stored operation sequence to be carried out via an operation unit and to a control method for the apparatus.

2. Related Background Art

Some recent multi function peripheral (MFP) is provided with a macro function of sequentially storing an operation sequence such as predetermined key depression by a user and reproducing the stored operation sequence (for example, refer to Japanese Patent Application Laid-open Publication No. 2000-222100).

Processes to be executed on the basis of a user operation include processes to be executed upon an event occurrence synchronous with the user operation and processes to be executed upon an event occurrence asynchronous with the user operation. Processes to be executed upon an event occurrence asynchronous with a user operation are, for example, a lightweight directory access protocol (LDAP) reception process in which an external server connected to MFP searches a predetermined address by using LDAP which is a client-server protocol for accessing directory services to transmit data and MFP receives a response (address) from the external server. Namely, if an operation sequence for a send process is to be recorded as macros, these macros execute the send process by acquiring a desired address by using the LDAP reception process and thereafter transmitting data to the address. In the LDAP reception process, the user operation becomes asynchronous because of the time taken to acquire the response from the external server.

Although MFP can process an event synchronous with a user operation without any problem in executing a reproduce process of the macro function, it cannot process an event occurrence asynchronous with a user operation, such as the LDAP reception process. This is because there is a delay time due to a network congestion state, an external server state and the like, before MFP actually receives an address after an instruction of starting the LDAP reception process.

In order to operate the macro function without any problem, there is a wait time recording method which is a program for making a recorded event maintain a standby state for a predetermined time. For example, it can be considered to use a method by which a user estimates an event process time and records a predetermined wait time.

However, with this method of recording a predetermined wait time, even if an event is processed before the predetermined wait time, for the macro reproduction, the standby state continues for the recorded wait time wastefully. On the other hand, if a shorter wait time is recorded, there is a possibility that the next operation sequence is performed before the necessary information is acquired so that a proper reproduction is impossible.

It is therefore desired to configure MFP to improve a user operation performance and to customize the wait time recording method more in detail for users. It is also desired to reliably operate the macro function even if an operation sequence has an event occurrence asynchronous with a user operation.

SUMMARY OF THE INVENTION

A feature of the present invention is to provide a data processing apparatus and its control method capable of eliminating the above-described inconvenience.

Another feature of the present invention is to provide a data processing apparatus and its control method capable of reliably operating a macro function even if an operation sequence has an event occurrence synchronous with a user operation.

The above-described features and other features of the present invention will become apparent from the detailed description given in the following specification and from the accompanying drawings.

BRIEF DESCRIPTION OF THE DRAWINGS

FIG. 1 is a schematic block diagram showing the internal structure of an image processing apparatus according to an embodiment of the present invention;

FIG. 2 is a schematic block diagram showing the internal structure of an HDD shown in FIG. 1;

FIG. 3 is a block diagram illustrating a relation between a UI application shown in FIG. 2 and an MFP shown in FIG. 1;

FIG. 7 is a diagram showing an example of a macro file to be formed by macro function units shown in FIG. 3;

FIG. 8 is a diagram showing the structure of a macro operation panel to be displayed during recording or reproducing the macro file shown in FIG. 7;

FIG. 32 is a diagram showing the basic macro screen shown in FIG. 6 selecting a macro file key.

DESCRIPTION OF THE PREFERRED EMBODIMENTS

Figure 4:
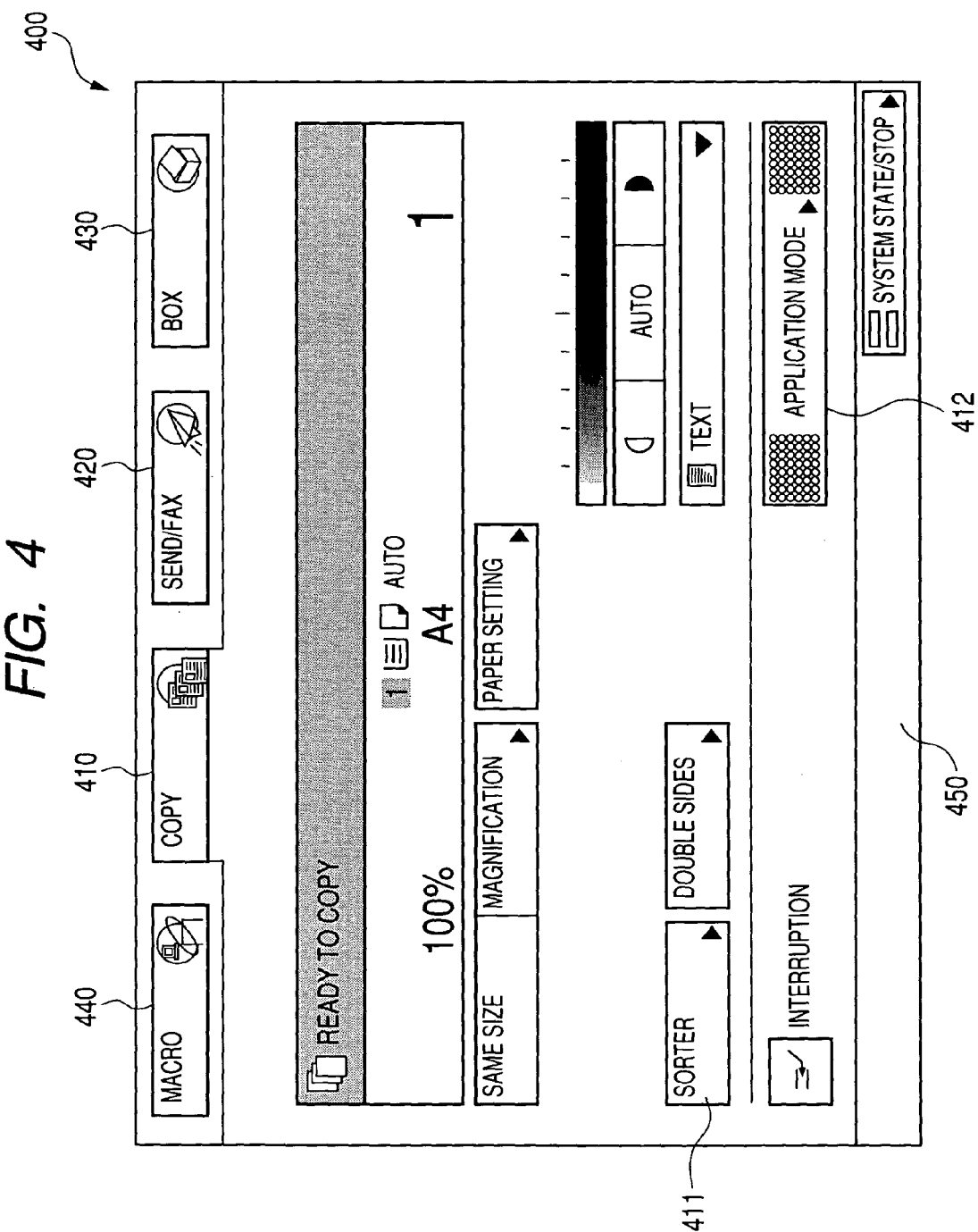
FIG. 4 is a diagram showing the structure of a basic copy screen to be displayed on an LCD shown in FIG. 1.

The embodiments of the present invention will be described with reference to the accompanying drawings.

FIG. 1 is a schematic block diagram showing the internal structure of an image processing apparatus according to the embodiment of the present invention.

Referring to FIG. 1, an MFP 100 as the image processing apparatus according to the embodiment of the present invention is constituted of: a CPU 101 for controlling the entirety of MFP 100; a hard disk drive (HDD) 102 for storing a program to be executed by CPU 101 in a hard disk; a RAM 103 having a work memory for CPU 101; a scanner 104 for reading an image of an original and storing the image data in RAM 103; a printer 105 for printing image data stored in RAM 103; an LCD controller 107 connected to a liquid crystal display (LCD) 106 for displaying images corresponding to image data and screen data on a display screen; hard keys 108; a touch panel controller 110 connected to a touch panel 109; a video RAM (VRAM) 111 connected to an LCD controller 107; and a CPU bus 112 interconnecting the above-described devices. VRAM 111 is a buffer for writing screen data to be displayed on LCD 106.

The hard keys 108 include: ten-keys for entering numerical values; a clear key for clearing an input value, a reset key for resetting set data; a start key for starting a job execution in accordance with user settings; and a stop key for stopping a job under execution. These keys are not shown in FIG. 1. Information entered by depressing these keys is supplied to CPU 101.

CPU 101 reads and executes the program stored in a hard disk in HDD 102 when necessary. The touch key 108 corresponds to soft keys displayed on the display screen of LCD 106.

In FIG. 1, CPU 101 reads image data and screen data constituting a display screen of LCD 106 from a hard disk in HDD 102, VRAM 111 maps data of the display screen, and the LCD controller 107 controls LCD 106 to display the display screen.

FIG. 2 is a schematic block diagram showing the internal structure of a hard disk in HDD 102 shown in FIG. 1.

As shown in FIG. 2, HDD 102 stores in a hard disk: an OS/BIOS 210 including an operating system (OS) and a basic input/output system (BIOS); a copy application 220 constituted of programs for CPU 101 to execute a copy process of copying data on a recording sheet supplied from a paper supply tray at the scanner 104 and printer 105; a send/fax application 230 constituted of programs for CPU 101 to execute a send process of an E-mail or fax to a transmission destination having a predetermined mail address or fax number; and an UI application 240 constituted of programs for CPU 101 to display a predetermined image on a user interface (UI) or to receive a user input via UI. OS/BIOS 210 is related to the applications 220, 230 and 240 and reads and executes some of these applications when necessary.

FIG. 3 is a block diagram showing a relation between the UI application 240 shown in FIG. 2 and the function of MFP 100 shown in FIG. 1.

As shown in FIG. 3, a UI frame work 241 is set to the UI application 240, and the UI application 240 is related to function units of MFP 100 via the UT frame work 241. The function units of MFP 100 includes: a copy function unit 320 for executing the copy application 220 shown in FIG. 2; a send function unit 330 for executing the send/fax application 230 shown in FIG. 2; a macro function unit 340 for executing a macro process to be described later, and a box function unit 350.

Set to the UI frame 241 are a hard key control unit 242 related to the hard keys 108, a touch key control unit 243 related to soft keys of the touch panel 109, a view control unit 244 related to LCD 106; and a macro control unit 145 related to the macro function of MFP 100.

The operation of MFP 100 shown in FIG. 1 will be described with reference to FIGS. 2 and 3.

In FIG. 1, as a predetermined one of the soft keys of the touch panel 109 is depressed, CPU 101 reads the coordinate values of the depressed soft key of the touch panel 109 on the display screen of LCD 106, and judges whether there is an effective key corresponding to the coordinate values. If there is the effective key corresponding to the coordinate values, CPU 101 generates a key code corresponding to the key. As a predetermined one of the hard keys 108 is depressed, CPU 101 generates the key code of the depressed hard key 108.

As the key code is generated for a predetermined key of the hard keys 108 or touch panel 109 (hereinafter simply called a "key"), BIOS of OS/BIOS 210 transmits the generated key code to the UI frame work 241. The UI frame work 241 notifies the key code to the function units operating in MFP 100 via the hard key control unit 242 or touch key control unit 243. The function unit of MFP 100 received the key code reads and executes the program registered in advance to be executed by using the key code if depression of the key corresponding to the key code is valid, i.e., the program registered as a key input event listener.

Next, if BIOS judges that the display screen of LCD 106 is required to be rewritten in response to the key depression, BIOS generates predetermined screen data and issues a display request to the view control unit 244. In response to this display request, the view control unit 244 writes screen data in VRAM 111 and instructs the LCD controller 107 to change the display screen.

When a printer status, which is information on the status of the printer 105, is notified from the printer 105, CPU 101 shown in FIG. 1 notifies the printer status to the control units 320 and 330 related to the applications 220 and 230 and to the UI frame work 241 related to the application 240. As shown in FIG. 3, the UI frame work 241 notifies the received printer status to the function units 320, 330, 340 and 350.

The function units 320, 330, 340 and 350 and the control units 242 to 245 of the UI frame work 241 judge the process to be executed and execute predetermined programs, in accordance with information contained in the received printer status.

For example, in accordance with the information contained in the received printer status, the view control unit 244 displays a predetermined screen. More specifically, in order to distinguish between the function units under operation and the function units not under operation, the view control unit 244 displays the display screen of LCD 106 in a distinguishable manner by using tags 410, 420, 430 and 440 to be described later. This distinguishable screen is displayed when the function units under operation request the view control unit 244 for the distinguishable screen.

Figure 5:
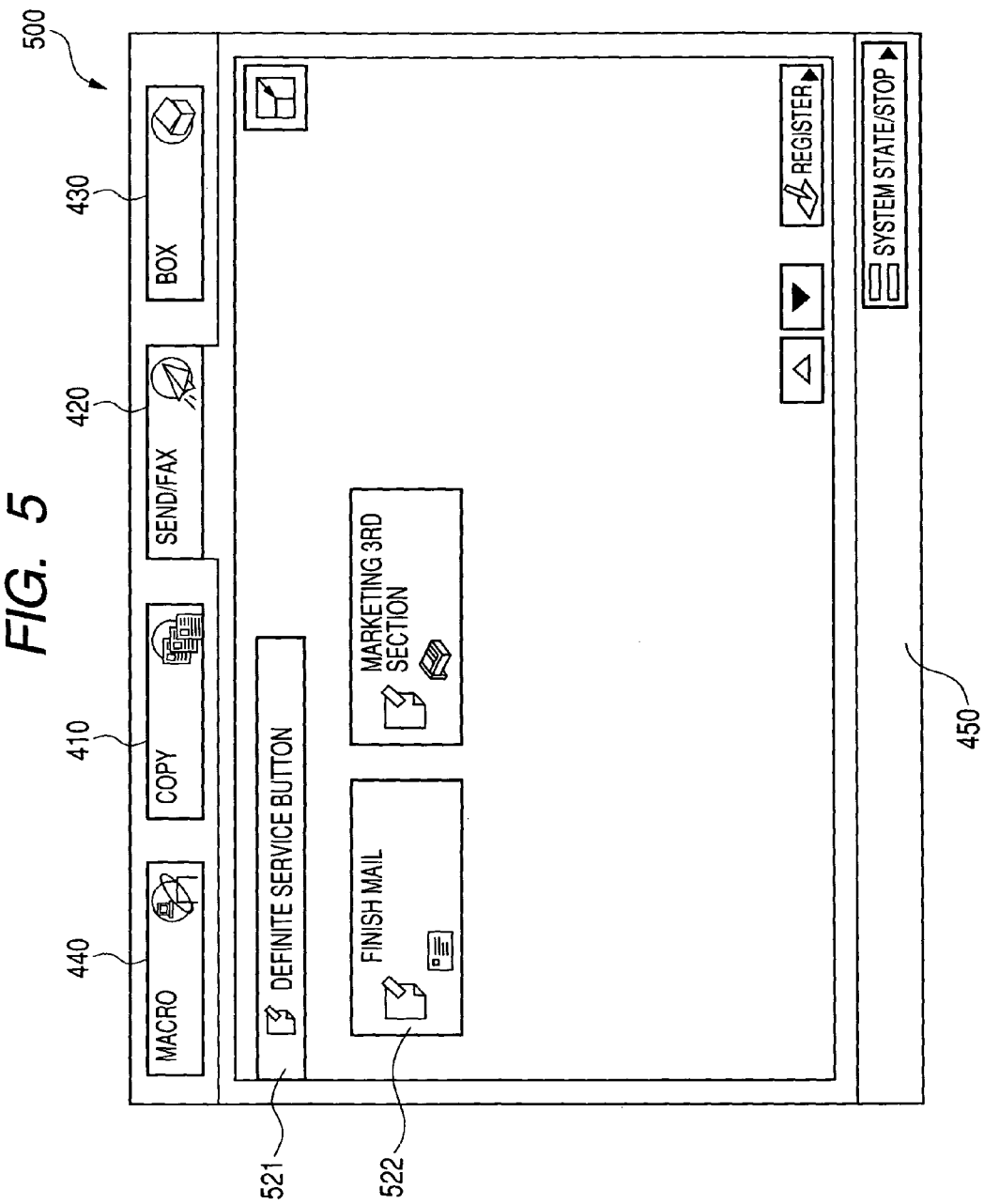
FIG. 5 is a diagram showing a basic transmission screen to be displayed on LCD shown in FIG. 1 for execution of a send/fax function.
Figure 6:
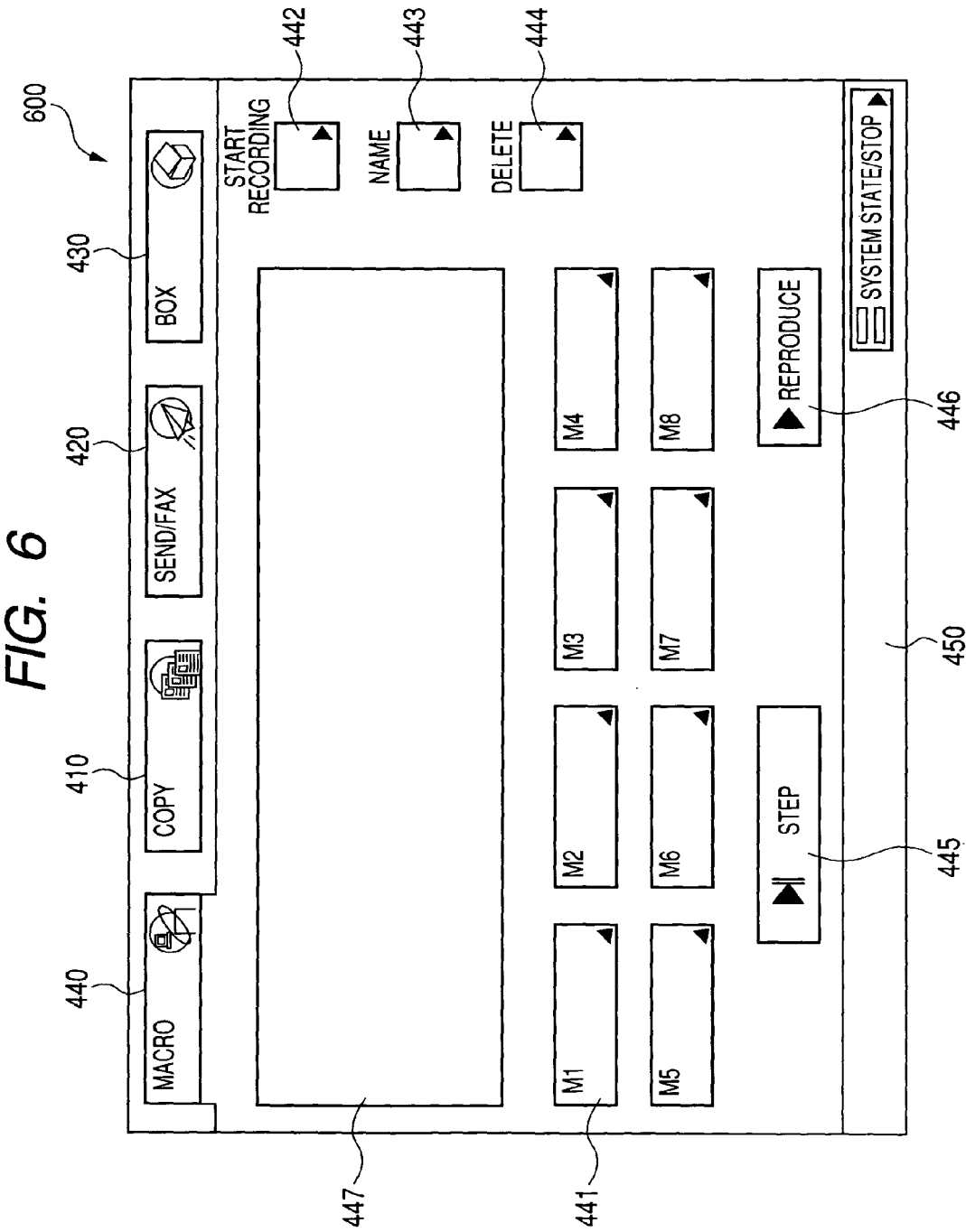
FIG. 6 is a diagram showing a basic macro screen to be displayed on LCD shown in FIG. 1, for execution of a macro function.

If one of the four functions of MFP 100 is to be operated, a basic screen corresponding to the function is displayed on the display screen of LCD 106. With reference to FIGS. 4 to 6, these basic screens will be described.

FIG. 4 is a diagram showing the structure of a basic copy screen to be displayed on LCD 106 shown in FIG. 1.

The basic copy screen 400 shown in FIG. 4 is constituted of: four tabs corresponding to the four functions of MFP 100 displayed in an upper area, i.e., a "copy" tab 410, a "send/fax" tab 420, a "box" tab 430 and a "macro" tab 440; and a status display row 450 displayed in a lower area. The status display row 450 is displayed independently from the four tabs 410, 420, 430 and 440, and always displays the status of MFP 100. This basic copy screen 400 is displayed on the display screen of LCD 106 when a user depresses the "copy" tab 410 to operate the copy function while the function other than the copy function is operated.

Provided in generally a central area of the basic copy screen 400 are: a "sorter" button 411 for performing a sorter process by using a sorter; and an "application" button 412 for setting a layout such as a reduction layout when an image of an original is copied on a recording sheet in a reduction mode.

In accordance with the contents set by a user on the basic copy screen 400, MFP 100 executes a copy process by using the scanner 104, printer 105 and copy function unit 320. The contents to be set by a user include execution of a sort process, a magnification change process and the like.

FIG. 5 is a diagram showing a basic send screen to be displayed on LCD 106 shown in FIG. 1, for execution of a send/fax function.

Similar to the basic copy screen 400 shown in FIG. 4, the basic send screen 500 is constituted of the tabs 410, 420, 430 and 440 provided in the upper area and the status row 450 provided in the lower area. This basic send screen 500 is displayed on the display screen of LCD 106 when a user depresses the "send/fax" tab 420 to operate the send/fax function while the function other than the send/fax function is operated.

In accordance with the contents set by a user on the basic send screen 500, MFP 100 executes an E-mail send process or a fax send process.

FIG. 6 is a diagram showing a basic macro screen to be displayed on LCD 106 shown in FIG. 1, for execution of a macro function.

Similar to the basic copy screen 400 and basic send screen 500 shown in FIGS. 4 and 5, the basic macro screen 600 is constituted of the tabs 410, 420, 430 and 440 provided in the upper area and the status row 450 provided in the lower area. This basic macro screen 600 is displayed on the display screen of LCD 106 when a user depresses the "macro" tab 440 to operate the macro function while the function other than the macro function is operated.

As shown in FIG. 6, provided in generally a central area are: macro file keys 441 to be used for generating a macro file 700 of FIG. 7 to be described later and calling the generated macro file 700; a "record start" key 442 to be used for starting a record process of generating the macro file 700; a "name" key 443 to be used for giving a name to a macro file key 441 and changing a given name; a "delete" key 444 to be used for deleting the generated macro file 700; a "step" key 445 to be used for confirming the contents of a process (step) recorded in the called macro file 700; a "reproduce" key 446 to be used for starting reproducing the contents of the process (step) recorded in the called macro file 700; and a macro information display area 447 to be used for displaying information such as the contents recorded in the called macro file 700.

A plurality of macro file keys are displayed as shown in FIG. 6, one macro file key is related to one macro file, and RAM 103 stores a macro file key management table for managing these macro files. A user can select one macro file by selecting one macro key from a plurality of macro file keys.

It is configured in such a manner that depression of the keys 442 to 446 is disabled if no macro file key is selected and enabled if any macro file key is selected. It is also configured in such a manner that depression of the keys 443 to 446 is disabled if no macro file is selected (generated) and enabled if any macro file is selected (generated).

In accordance with the contents set by a user on the basic macro screen 600, MFP 100 executes the macro process detailed in the following.

The macro process is constituted of a record process and a reproduce process. In the record process, the macro function unit 340 shown in FIG. 3 records as a script (program) an operation sequence of each process executed in accordance with a user operation, on the basis of the copy function and the send/fax function of MFP 100, in the macro file 700 shown in FIG. 7 to be described later. In the reproduce process, the script recorded in the macro file 700 is executed to reproduce each process of the operation sequence while making transition of the display contents on LCD 106.

Firstly, description will be made on the record process to be executed when the macro function is operated. This record process records a series of operations, for example, printing images on double sides of a predetermined recording sheet in a reduction layout, sorting a plurality of recording sheets output in this manner, discharging the recording sheets on predetermined trays, and transmitting a completion notice E-mail to a predetermined address to notify a predetermined user of a completion of the above-described operations.

Description will be made on the operation using the basic macro screen shown in FIG. 6.

As a macro file key 441 whose macro file is still not generated is selected and the "record start" key 442 is depressed, MFP 100 starts a record process of generating a macro file 700. Before the "record start" key 442 is depressed, by using the "name" key 443, a name of the macro file 700 to be newly generated may be given.

FIG. 7 is a diagram showing an example of the macro file 700 generated by the macro function unit 340 shown in FIG. 3.

The macro file 700 shown in FIG. 7 is generated during execution of a record process of the macro process by the macro function unit 340 shown in FIG. 3, for example, by using Pnuts (Sun Microsystems Inc.) which is one of script languages, and registered in a memory, e.g., RAM 103 of MFP 100. The script language is written in a text format and is a program for complementing the function of a predetermined application.

The macro file 700 is made of a plurality of programs at first to nineteenth rows each writing one script, and the program at each row complements the function of each of the applications 220, 230 and 240 and the like.

In the following, description will be made on a program written at each row of the macro file 700 shown in FIG. 7.

The script [import("jmmf.macro.*")] at the first row is a script unconditionally written at the first row of the macro file 700, and is the program for instructing to import to this macro file 700 an external file having the name ["jmmf.macro.*] which is different from the macro file 700.

The external file defines a function "push" written in the scripts at the second to fifteenth rows and seventeenth and eighteenth rows, a function "wait" written at the sixteenth row, a function "quit" written at the nineteenth row, and other functions to be described later.

For example, the external file defines that the function "push" means a depression of a predetermined key of the hard keys 108 or touch panel 109 and that a function, a class and an instance are defined as arguments of the function "push". The function is constituted of a function ID for identifying each function of MFP 100, the class is constituted of a screen ID for identifying a display screen or sub-screen of LCD 106 during execution of the function, and the instance is constituted of a key ID for identifying a predetermined key on a predetermined display screen identified by the screen ID. Namely, by using these arguments, a key depressed by a user in the record process, i.e., a key to be depressed by MFP 100 during the reproduce process, can be identified uniquely. For each user operation, the contents of the function, class and instance are judged and the contents are sequentially written as a script.

It is defined for the function "wait" that as an event to be paired to an event generated by a user operation, if an operation immediately before is required to receive a predetermined status in order to execute the next operation, a predetermined function unit or a predetermined constituent element of MFP 100 shown in FIG. 1 stands by to receive the status (hereinafter called an "device status").

For the function "wait", a function, a class and an instance are defined as arguments. The function is constituted of a function unit ID for identifying a function unit which is required to execute the program for operating the function of MFP 100, the class is constituted of a type ID for identifying the type of a program to be executed by the function unit, and the instance is constituted of a status ID for identifying an execution status of the program. Namely, by using these arguments, the execution status of the program to be executed by the function unit can be identified uniquely.

The function "wait" may set a predetermined wait time instead of the above-described device status.

The function "quit" in the external file defines an execution end of the record process of the macro process, i.e., a generation completion of the macro file 700.

The scripts at second to nineteenth rows of the macro file 700 shown in FIG. 7 will be later described.

In this embodiment, the macro file 700 has a simple structure that "push", "wait" and "quit" are used as the functions and the function, class and instance are used as the arguments. It is therefore easy to record and reproduce the macro function, and is able to reduce a portion dependent upon the specifications of the image processing apparatus as much as possible. For example, "import" to another apparatus can easily realized by simple alteration so as to match the function, class and instance.

Figure 9:
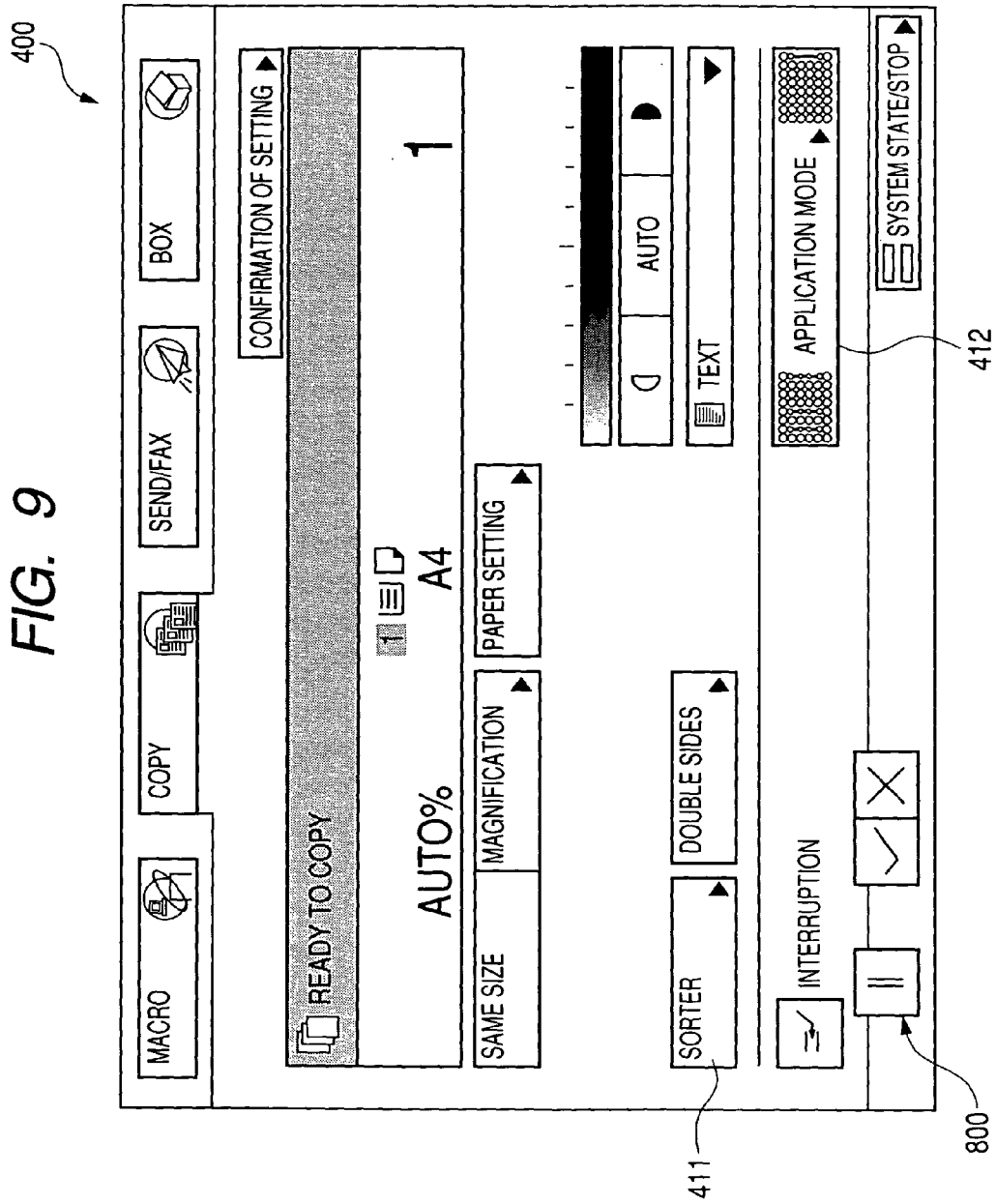
FIG. 9 is a diagram showing the basic copy screen shown in FIG. 4 partially superposed by the macro operation panel shown in FIG. 8.

FIG. 8 is a diagram showing the structure of a macro operation panel displayed during recording or reproducing the macro file 700 shown in FIG. 7. FIG. 9 is a diagram showing the basic copy screen 400 shown in FIG. 4 partially superposing the macro operation panel shown in FIG. 8.

A portion or the whole of the macro operation panel 800 shown in FIG. 8 is displayed on the display screen of LCD 106 during execution of the record process or reproduce process of the macro process. The macro operation panel 800 is constituted of: a pose key 810 for instructing a pose of reproduction of a process (step) corresponding to a predetermined script in the macro file 700; a reproduce key 820 for instructing to release the pose instructed by the pose key 810; a register key 830 for instructing to register the macro file 700 generated upon execution completion of the record process into RAM 103; a cancel key 840 for instructing to cancel execution of the record process or reproduce process; and a step execution key 850 for instructing a pose after each next user operation (script at each next row) registered in the macro file 700 is executed.

During execution of the record process of the macro process, the pose key 810, register key 830 and cancel key 840 are displayed on the display screen of LCD 106. During execution of the reproduce process upon depression of the "reproduce" key 446, the cancel key 840 is displayed on the display screen of LCD 106. During execution of the reproduce process upon depression of the "step" key 445, the reproduce key 820, register key 830, cancel key 840 and step execution key 850 are displayed on the display screen of LCD 106.

In the state that the macro operation screen 800 is displayed on the basic macro screen 600 shown in FIG. 6, as a user depresses the "copy" tag 410, the basic copy screen 400 of FIG. 4 is displayed together with the macro operation screen 800 to make transition to the display screen shown in FIG. 9.

As the copy function is operated in response to a user operation on the basic copy screen 400 shown in FIG. 9, the UI frame work 241 informs the user operation, i.e., the event generated by key depression, to the function unit related to the program registered as the key input event listener, and at the same time to the macro control unit 245. The macro control unit 245 sequentially forms as a script the user operation and the event generated by the user operation, to complete the macro file 700 constituted of the scripts described below.

The script at the second row of the macro file shown in FIG. 7 is a special script identifying (none) of the IDs of the class and instance. This script constitutes the program indicating that a predetermined function operated by MFP 100 during execution of the record process of the macro process is changed to another function, e.g., from the macro function to the copy function, i.e., indicating that the user depressed the "copy" tab 410, and executing the same process during the reproduce process. Similarly, each of the following scripts constitutes the program for executing the same process as a user operation or an event generated by the user operation.

The script at the third row indicates that a key having an instance [sorter], i.e., the "sorter" key 411, is depressed on the basic copy screen 400 having a class [base] and displayed at the operation start, during execution of the copy function having a function [copy].

Figure 10:
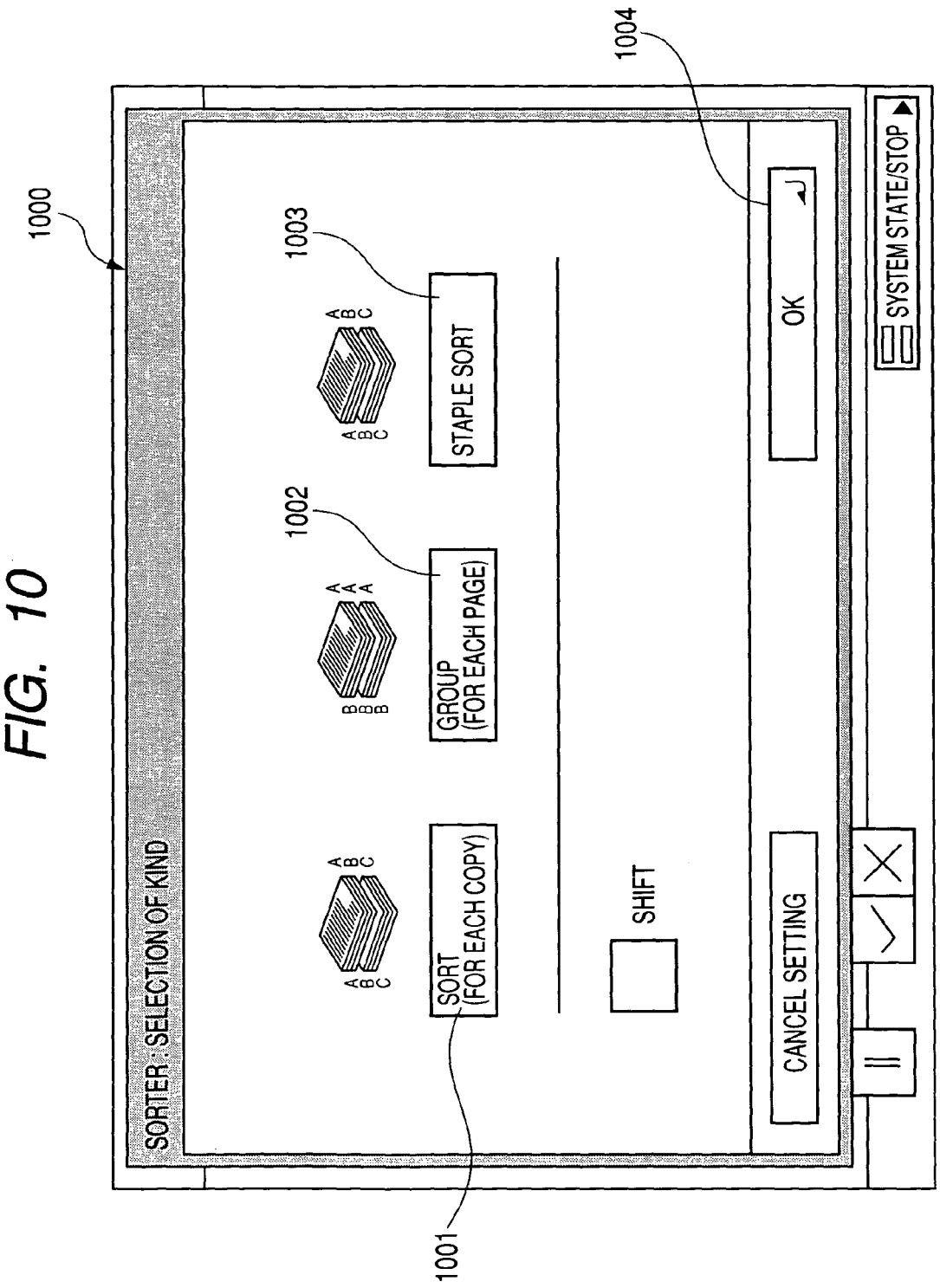
FIG. 10 is a diagram showing the structure of a sorter screen to be displayed on LCD shown in FIG. 1.

The script at the fourth row indicates that the "sort" key 1001 for executing a sort process for each copy of the predetermined number of recording sheets discharged to a tray is depressed on a sorter screen 1000 shown in FIG. 10 displayed on the display screen of LCD 106 upon depression of the "sorter" key 411 during execution of the copy function. The "sort" key 1001 may be selected as a default on the sorter screen 1000 to omit user depression during execution of the record process.

In addition to the "sort" key 1001, the sorter screen 1000 shown in FIG. 10 is provided with a "group" key 1002 for performing a process of grouping each page of a plurality of recording sheets discharged to the tray and a "staple sort" key 1003 for performing a sort process for a predetermined number of recording sheets discharged to the tray and a staple process for the sorted recording sheets.

The script at the fifth row indicates depression of an "OK" key 1004 on the sorter screen 1000.

Figure 11:
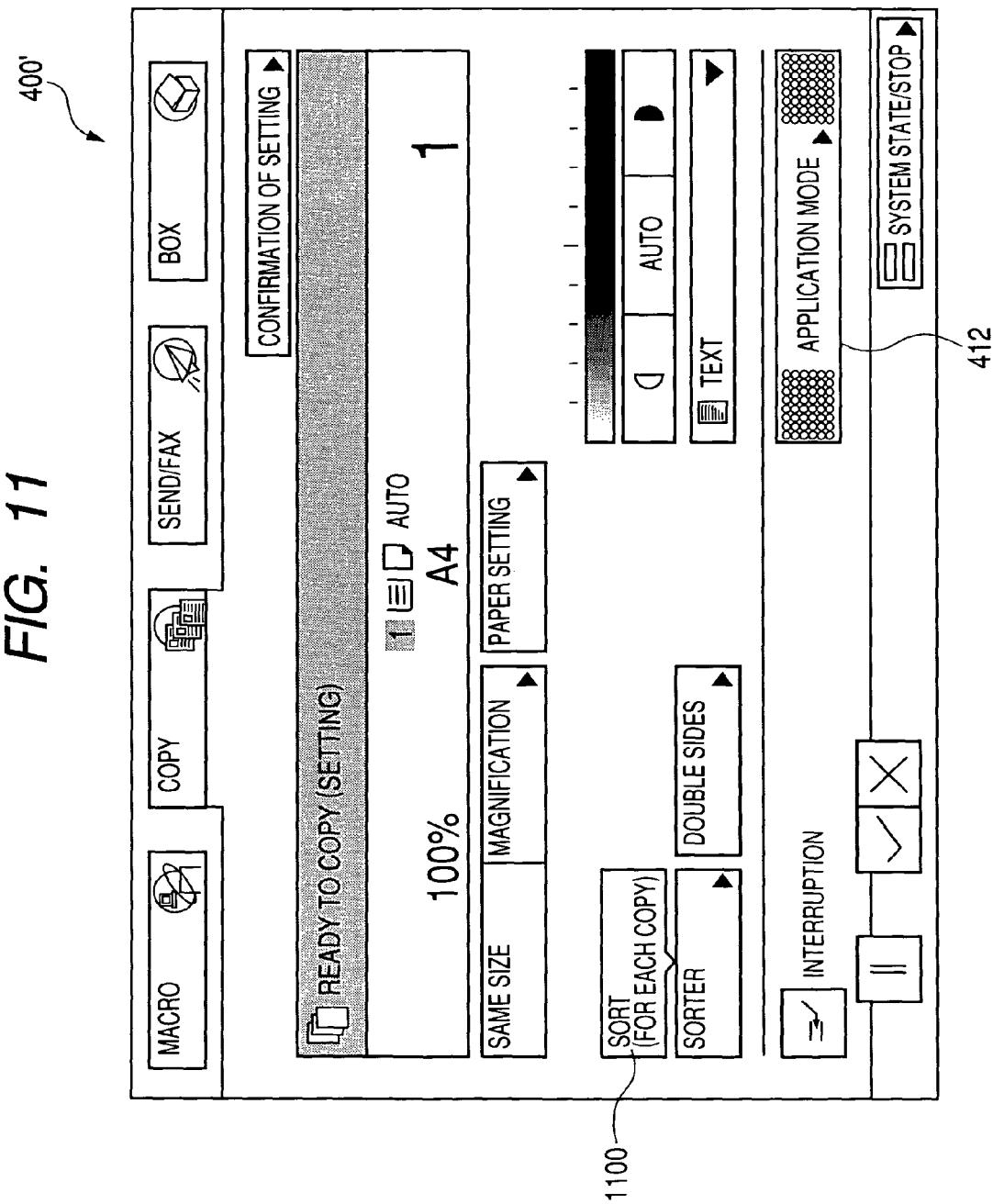
FIG. 11 is a diagram showing the basic copy screen shown in FIG. 9 additionally displaying the contents set via the sorter screen shown in FIG. 10.

Upon depression of this "OK" key 1004, the display screen of LCD 106 is subjected to transition to a basic copy screen 400' shown in FIG. 11. This basic copy screen 400' displays the basic copy screen 400 of FIG. 9, and in addition, setting contents 1100 set on the sorter screen 1000 of FIG. 10, i.e., the sort process for each copy.

The script at the sixth row indicates depression of the "application mode" key 412 having an instance [special] on the basic copy screen 400'.

Figure 12:
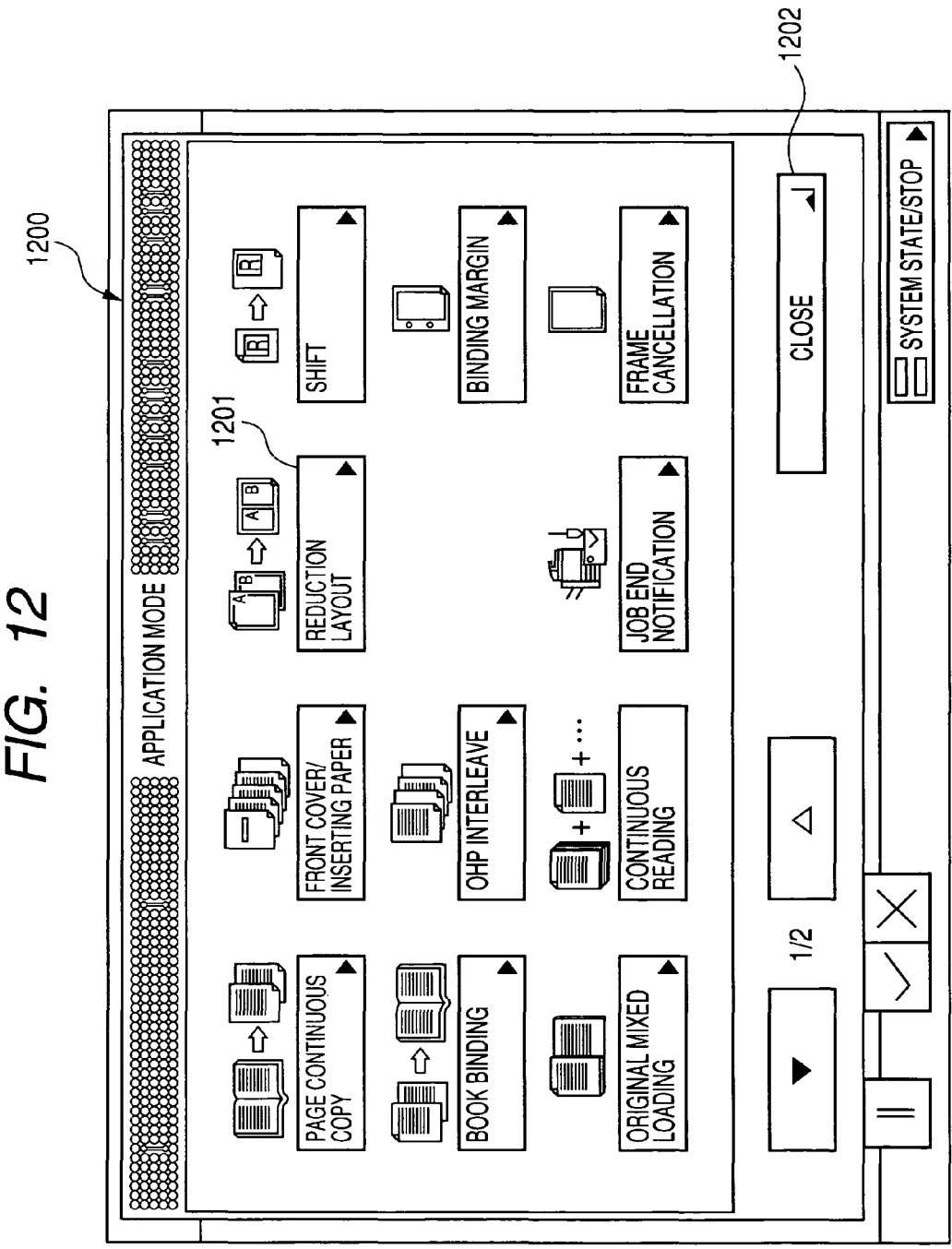
FIG. 12 is a diagram showing the structure of an application mode screen to be displayed on LCD shown in FIG. 1.

The script at the seventh row indicates depression of, for example, a "reduction layout" key 1201 having an instance [Nin1] on an application mode screen 1200 of FIG. 12 displayed on the display screen of LCD 106 upon depression of the application mode key 412.

Figure 13:
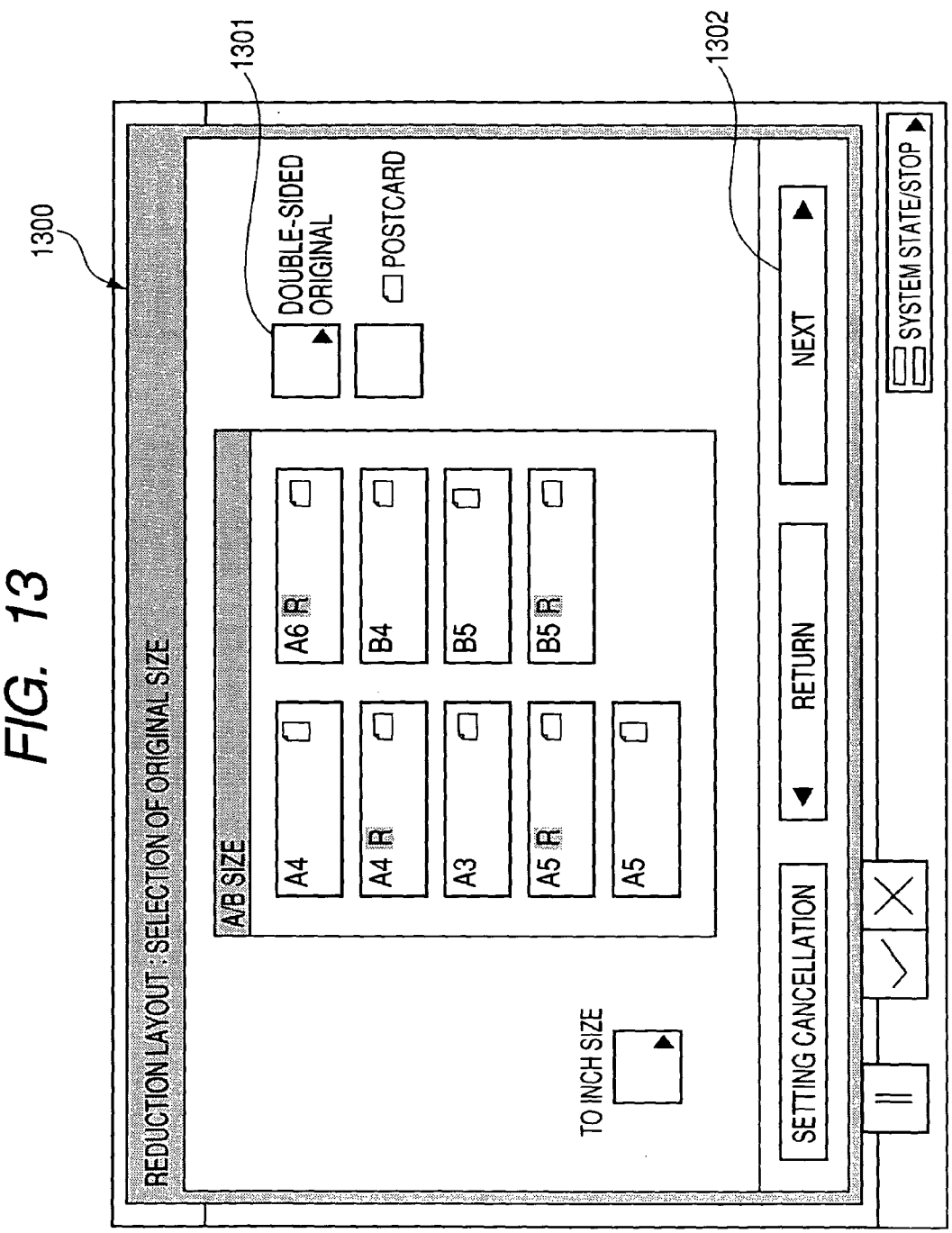
FIG. 13 is a diagram showing the structure of a reduction layout screen to be displayed on LCD shown in FIG. 1.

The script at the eighth row indicates depression of, for example, a "double sided original" key 1301 having an instance [docDup] on a reduction layout screen 1300 of FIG. 13 having a class [special_Nin1] displayed on the display screen of LCD 106 upon depression of the "reduction layout" key 1201.

The reduction layout screen 1300 of FIG. 13 is a screen to be used for setting information on an original. A user designates on the application mode screen 1200 an original size, and a double sided original having images printed on both sides or a single sided original having an image printed on one side. The defaults of the application mode screen 1200 is "A4" size for the original size and "one-side original". Therefore, as the "double sided original" key 1301 is depressed, the original size is set to the "A4" size.

Figure 14:
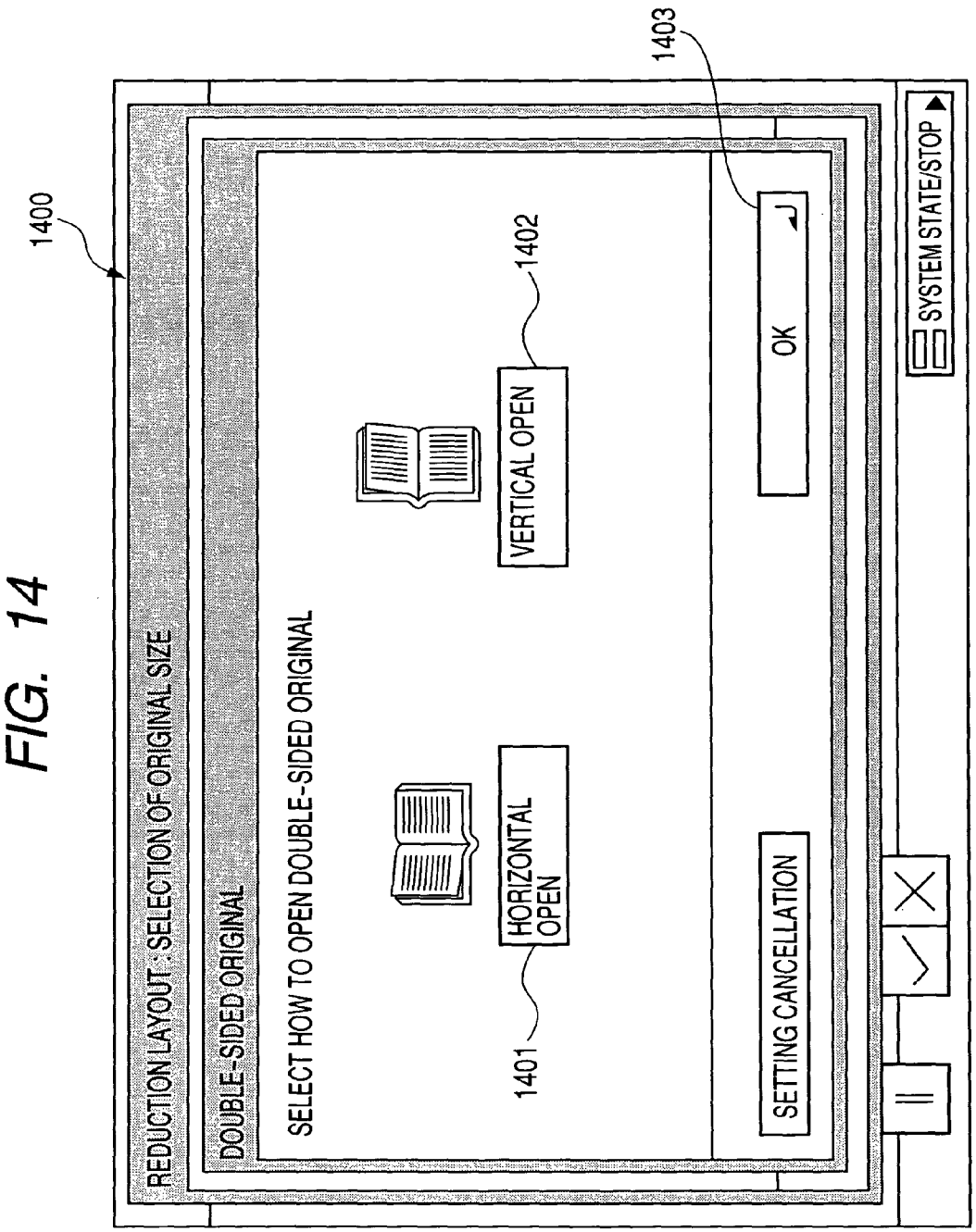
FIG. 14 is a diagram showing the structure of a double sided original screen to be displayed on LCD shown in FIG. 1.

The script at the ninth row indicates depression of an "OK" key 1403 on a double sided original screen 1400 of FIG. 14 having a class [special_Nin1_docDup] displayed on the display screen of LCD 106 upon depression of the "double sided original" key 1301. The double sided original screen 1400 is provided with a "horizontal open" key 1401 for designating that an original is a horizontal open type and a "vertical open" key 1402 for designating that an original is a vertical open type. The default is the "horizontal open" key 1401. Therefore, as the "OK" key 1403 is depressed, it is designated that the original is the horizontal open type and the reduction layout screen 1300 selecting the "double sided original" key 1301 is displayed on the display screen of LCD 106.

The script at the tenth row indicates depression of a "next" key 1302 on the reduction layout screen 1300. A layout screen 1500 of FIG. 15, which is a sub-screen of the reduction layout screen 1300, is displayed on the display screen of LCD 106.

Figure 15:
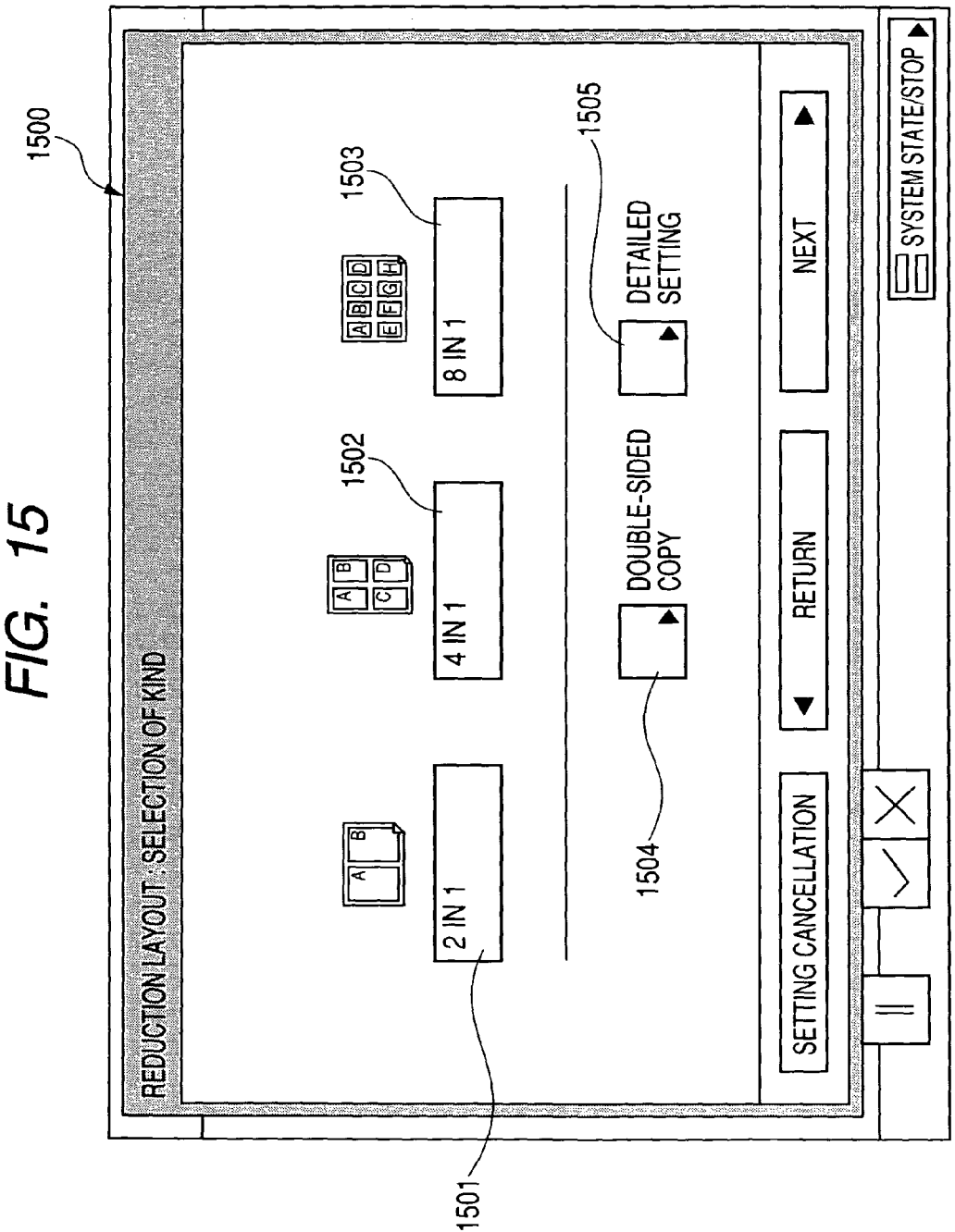
FIG. 15 is a diagram showing the structure of a layout screen to be displayed on LCD shown in FIG. 1.

The layout screen 1500 shown in FIG. 15 is used for setting output conditions, and is provided with a "2 IN 1" key 1501, a "4 IN 1" key 1502 and an "8 IN 1" key 1503 for designating how many pages of original images are printed on one recording sheet, a "double sided copy" key 1504 and a "detail setting" key 1505 for designating an output pattern such as a Z layout and an N layout and one-side or double-side copy of a recording sheet, and other keys.

The script at the eleventh row indicates depression of the "4 IN 1" key 1502 on the layout screen 1500 of FIG. 15, and the script at the twelfth row indicates depression of the "double sided copy" key 1504 having an instance [prntDup] on the reduction layout screen 1500. These scripts designate that original images of four pages are printed on a single side of a recording sheet and the print surface of the recording sheet is double sided.

Figure 16:
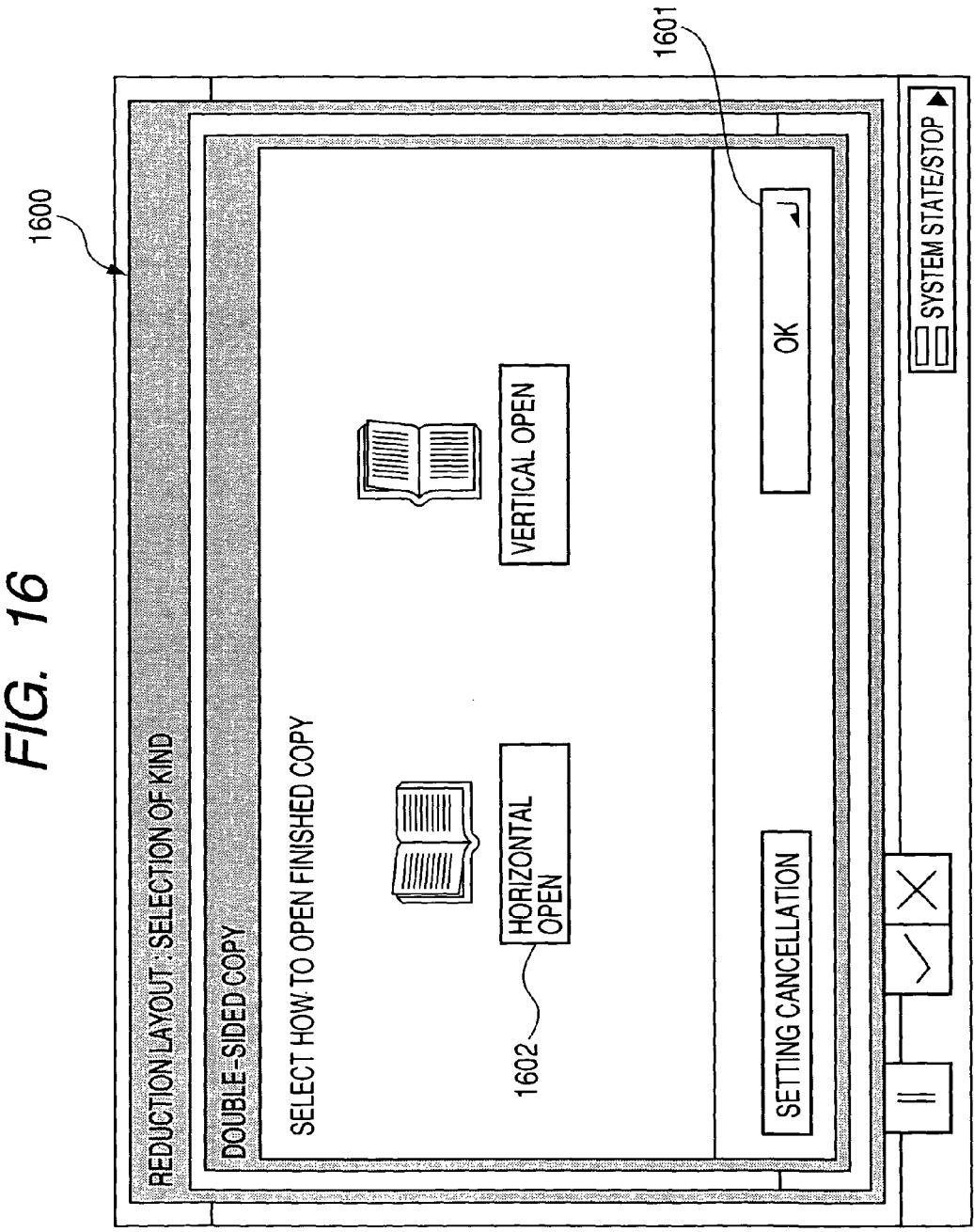
FIG. 16 is a diagram showing the structure of a double sided copy screen which is a sub-screen of the reduction layout screen shown in FIG. 15.

The script at the thirteenth row indicates depression of an "OK" key 1601 on a double sided copy screen 1600 of FIG. 16 which is a sub-screen of the reduction layout screen 1500 displayed upon depression of the "double sided copy" key 1504. The double sided copy screen 1600 is used for designating a print surface of a recording sheet, and a "horizontal open" key 1602 is used as a default. Upon depression of the "OK" key 1601, it is designated that the print surface of a recording sheet is of a horizontal open type and the double sided copy screen 1600 is subjected to transition to the application mode screen 1200.

The script at the fourteenth row indicates depression of a "close" key 1202 on the application mode screen 1200. Upon depression of the "close" key 1202, the display screen of LCD 106 is subjected to transition to the basic copy screen 400' shown in FIG. 11.

The script at the fifteenth row indicates depression of a start key of the hard keys 108 displayed on the basic copy screen 400'. Upon depression of the start key 106, setting a copy job in the copy function is established so that the copy job starts being executed by the scanner 104, printer 105 and copy function unit 320 (copy start).

The script at the sixteenth row records an execution completion of the copy job. That this event occurs upon depression of the copy start is registered beforehand in MFP 100. Namely, the operation recorded at the fifteenth row is an operation for the copy start, whereas the operation at the sixteenth row is performed to make the macro control unit 340 receive a response (copy job completion) generated by CPU 101 upon completion of the copy job. In this manner, of various statuses generated by an operation, the status to be recorded in the macro file is registered in RAM 103 of MFP 100 as a pair of the operation immediately before and an associated status. As the operation registered in RAM 103 is performed, the macro control unit 340 records the generation of the associated status as a macro.

Figure 17:
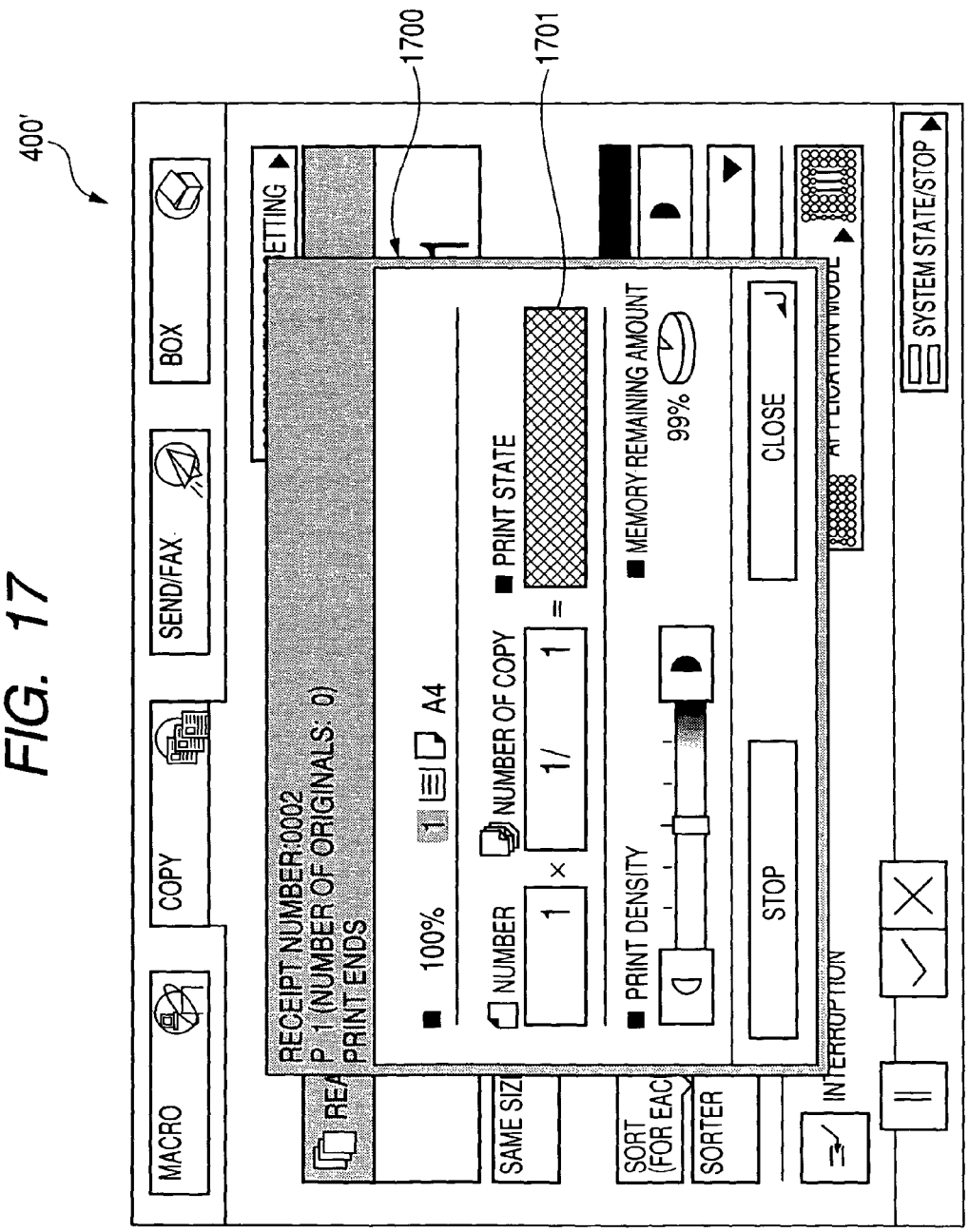
FIG. 17 is a diagram showing the structure of a print execution screen to be displayed on LCD shown in FIG. 1.

During the period from the start to end of execution of the copy job, a print execution screen 1700 such as shown in FIG. 17 is superposed upon the basic copy screen 400', and displayed on the display screen of LCD 106. An execution state of the print job is displayed on the print execution screen 1700 by a "print state" progress bar 1701 or the like. When execution of the print job is completed, the print execution screen 1700 is erased. These processes may be recorded in the macro file 700 as scripts.

When execution of the print job is completed, CPU 101 generates a copy job completion status which is received by the macro control unit 340.

After execution of the copy job is completed, the user depresses the "send/fax" tag 420 to change the display screen of LCD 106 to the basic send screen 500 shown in FIG. 5. The script of the macro file 700 at the seventeenth row indicates a change to the send/fax function having a function [send]. Upon depression of the "send/fax" tag 420, the basic send screen 500 and the superposed macro operation panel 800 are displayed on the display screen of LCD 106 (FIG. 18).

Figure 18:
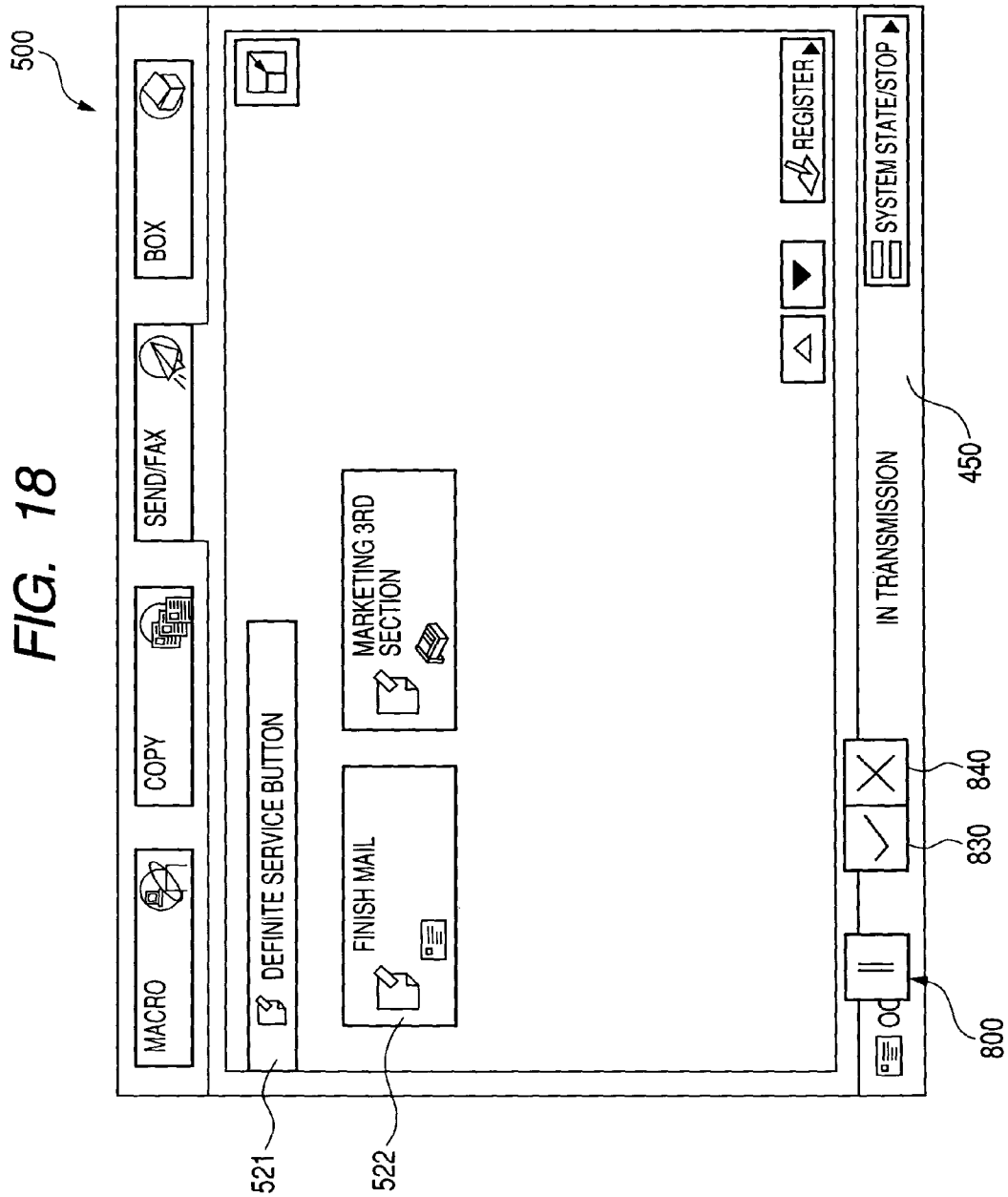
FIG. 18 is a diagram showing the structure of a basic send screen partially superposing the macro operation panel shown in FIG. 8.

The basic send screen 500 shown in FIG. 18 is used for setting and starting a send job in the send process of E-mail, FAX and the like. The basic send screen 500 is provided with a definite service button 521 set beforehand with information on definite services and a "finish mail" key 522 to be selected as a default. The "finish mail" key 522 is used for designating a notice representative of a completion of a predetermined job to be sent to a predetermined transmission designation. The script at the eighteenth row indicates depression of, a start key of the hard keys 108 displayed on the basic send screen 500 shown in FIG. 18. Upon depression of the start key, the send job starts being executed. During execution of the send job, a message to the effect that the send job is being executed is displayed on a status row 450 in a lower area of the basic send screen 500.

Figure 19:
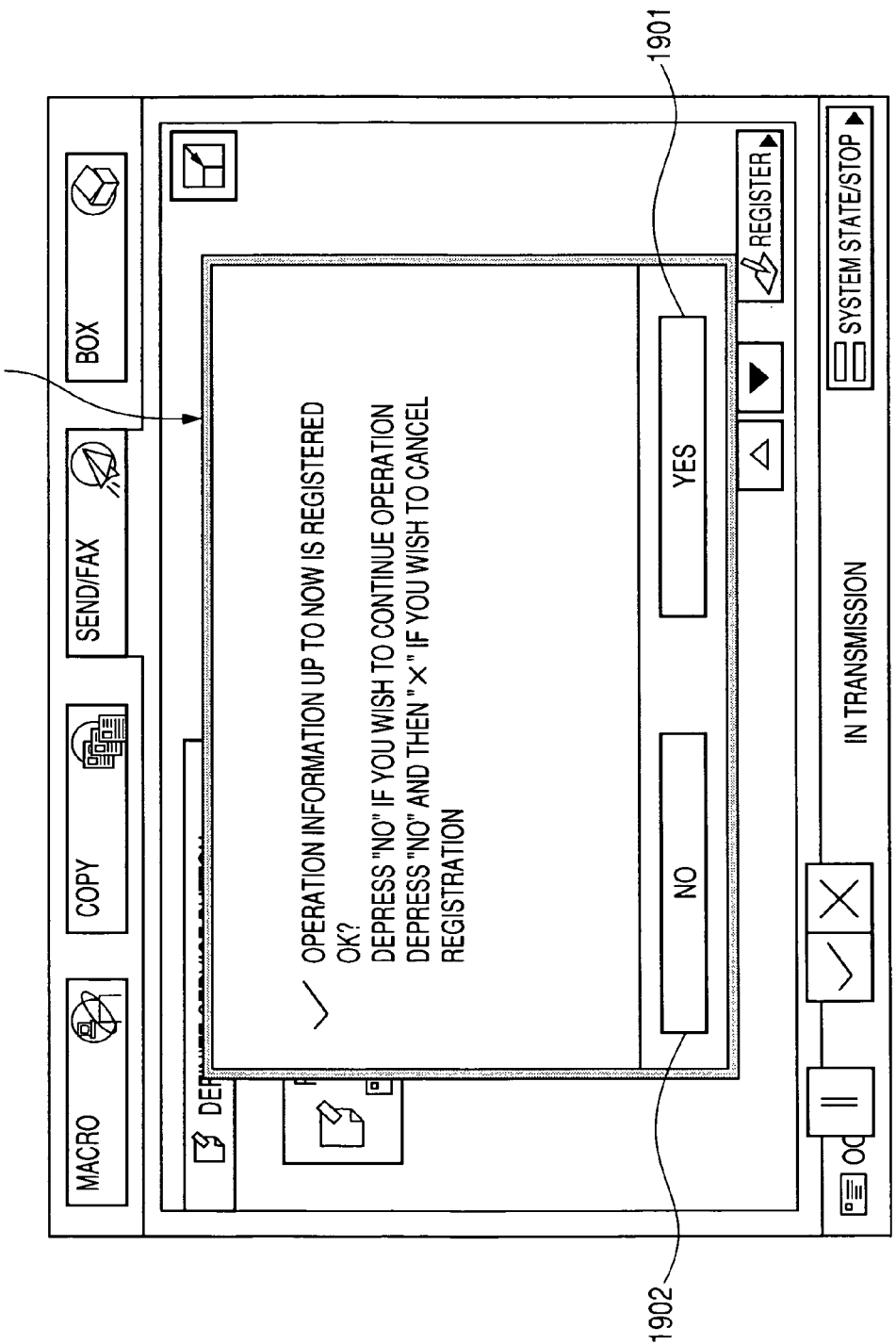
FIG. 19 is a diagram showing the structure of a register confirmation screen for confirming registration of the macro file shown in FIG. 7.

As the user depresses the register key 830 on the macro operation panel 800, a register confirmation screen 1900 such as shown in FIG. 19 is displayed to confirm whether the macro file 700 is registered.

As a user depresses a "Yes" key 1901 on the register confirmation screen 1900, a script indicating a generation end of the macro file 700 is written in the nineteenth row of the macro file 700. Thereafter, execution of the record process is terminated and the generated macro file 700 is registered in RAM 103.

Figure 20:
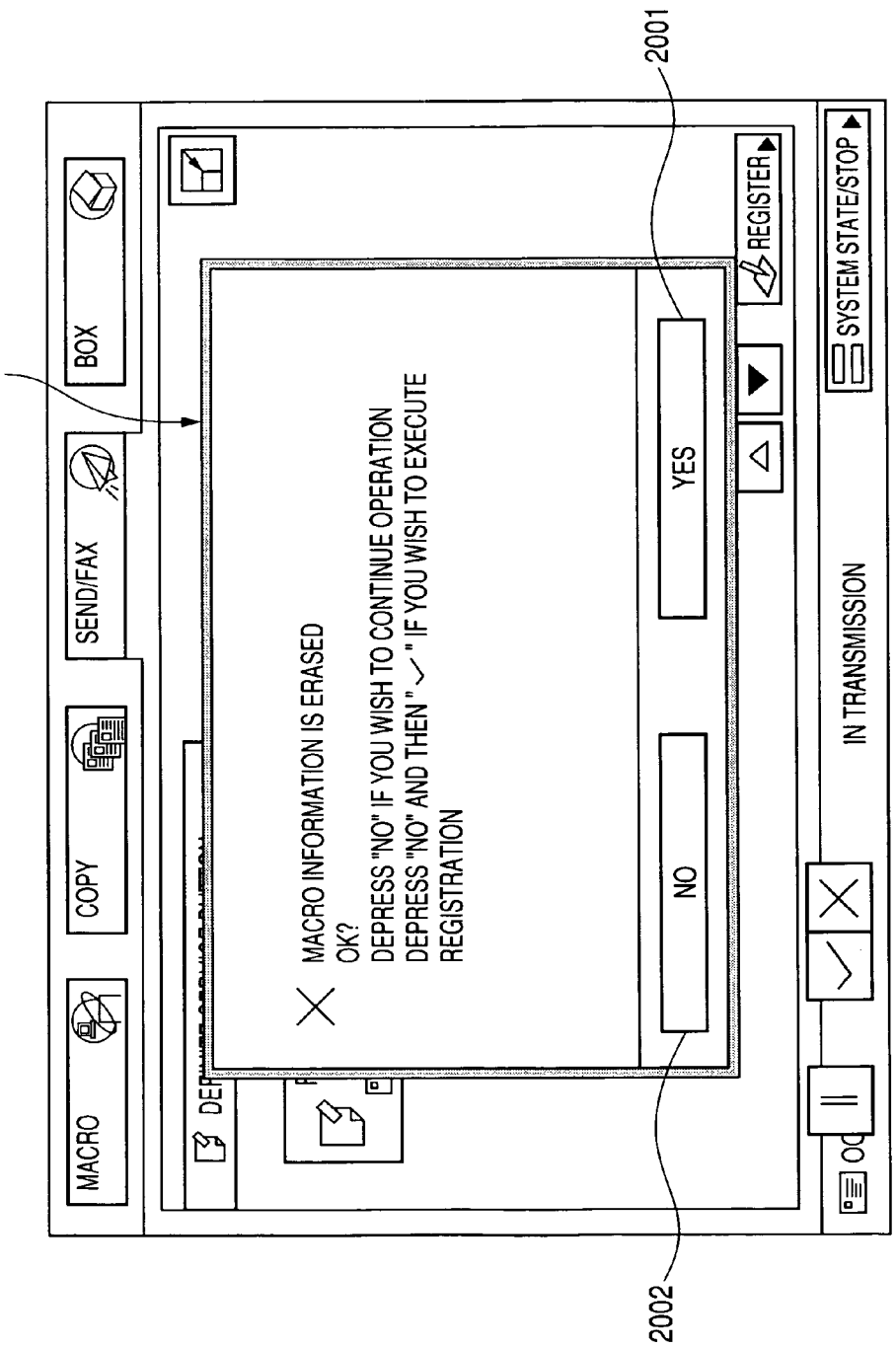
FIG. 20 is a diagram showing the structure of an erase confirmation screen for confirming erasure of the macro file shown in FIG. 7.

If the user depresses a "No" key 1902 on the register confirmation screen 1900, the record process continues to be executed. If the user depresses the cancel key 840 on the macro operation panel 800, an erase confirmation screen 2000 of FIG. 20 is displayed to confirm the user whether the macro file 700 is erased. If the user depresses a "Yes" key 2001, execution of the record process is cancelled and the macro file 700 is erased from a macro file key management table without registering the macro file in RAM 103, whereas if the user depresses a "No" key 2002, the record process continues to be executed.

According to the record process of the macro process, the macro file 700 shown in FIG. 7 records a series of user operations that original images printed on double sides are printed on double sides of a predetermined recording sheet in a reduction layout, a plurality of recording sheets output in this manner are sorted and discharged to predetermined trays, and a finish mail indicating completion of these processes is transmitted to a predetermined address. Accordingly, by executing the reproduce process of the macro process, the user can easily execute the same processes as the entered user operations.

According to the macro file 700 shown in FIG. 7, during the reproduce process of the macro process, the script at the fifteenth row performs the copy start upon depression of the start key on the basic copy screen 400 and the script at the sixteenth row generates an event of waiting for the completion of copy job execution. Namely, the macro control unit 245 manages a pair of the user operation and the event generated by the user operation, generates a script of a user operation registered in advance, at a predetermined row in the record process, and generates a script of the event paired to the user operation at the next row. In this manner, irrespective of the process time of an event generated asynchronously with the user operation, the next row can be reproduced immediately in response to the event process completion so that the reproduce process of the macro process can be executed reliably. Since it is not necessary for a user to consider the process time of an event generated asynchronously with the user operation, an operation performance of the user can be improved.

As a user depresses the register key 830 during execution of a finish mail send job in the record process of the macro process, it is not necessary to generate the script of waiting for the execution completion of the finish mail send job so that the user can customize the macro function more in detail and the operation performance of the user can be improved.

A function "wait" for waiting for the execution completion of the finish mail send job may be inserted between the eighteenth and nineteenth rows of the macro file 700 to be formed in the record process. It is therefore possible to reliably execute the reproduce process of the macro process.

Figure 21:
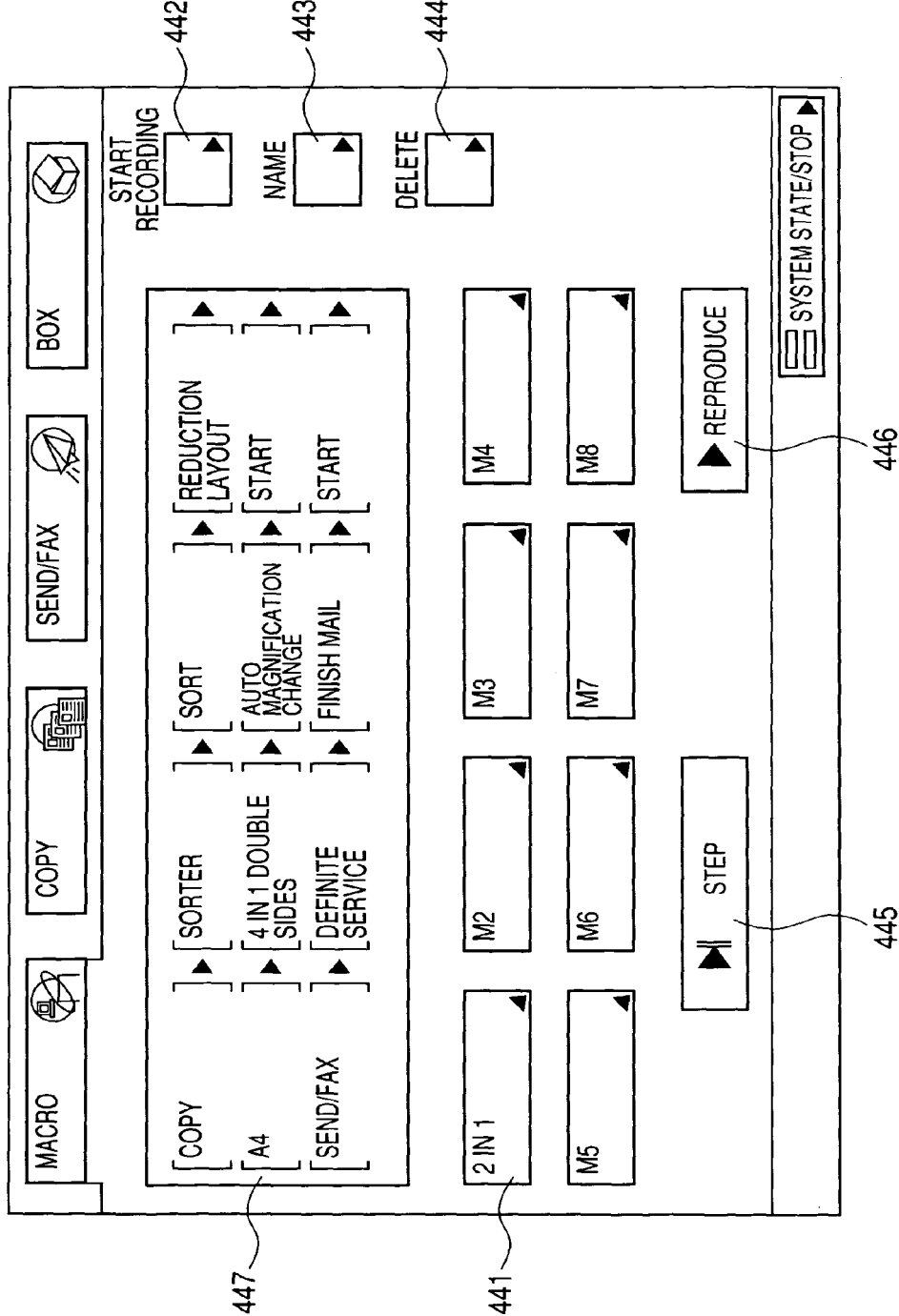
FIG. 21 is a diagram showing the contents of the macro file displayed on the basic macro screen shown in FIG. 6.

FIG. 21 is a diagram showing the contents of the macro file 700 displayed on the basic macro screen 600 shown in FIG. 6.

In FIG. 21, the contents of the macro file 700 are simplified and displayed in the macro information display area 447. The contents are displayed as a user depresses the macro file key 441 on the basic macro screen 600 shown in FIG. 6 and CPU 101 registers a file handle which is the name of the macro file 700 in the macro file key management table in RAM 103. After the macro file key 441 is depressed, the "step" execution key 445 and "reproduce" key 446 are displayed on the basic macro screen 600 and can be depressed.

As shown in FIG. 21, the name of the macro file key 441 is changed to "2 IN 1" by the user using the "name" key 443. In this manner, the user can easily identify the contents recorded in the macro file 700 to improve the operation performance of the user.

Figure 22:
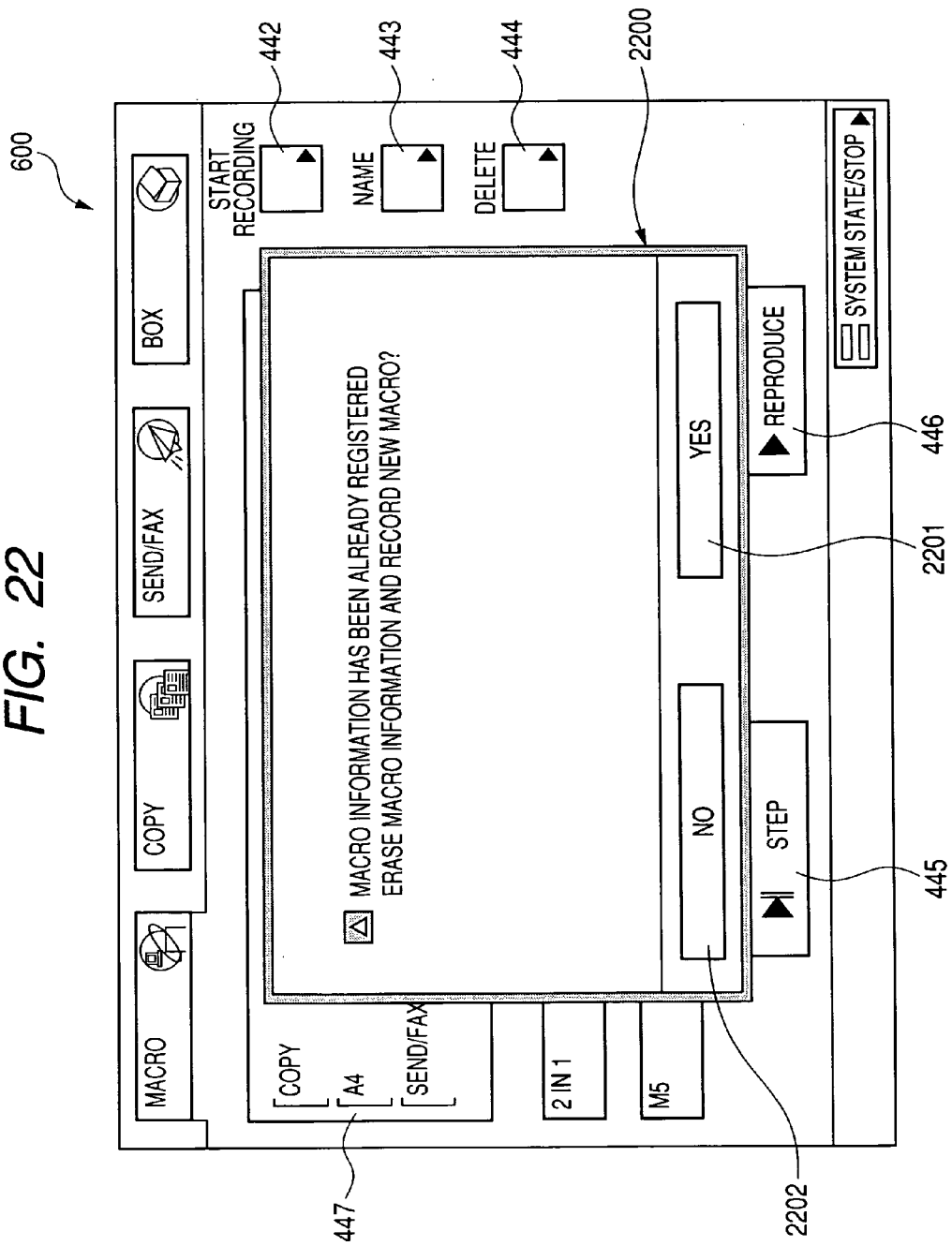
FIG. 22 is a diagram showing the structure of an example of an alarm screen to be displayed on LCD shown in FIG. 1.

FIG. 22 is a diagram showing an example of the structure of an alarm screen displayed on LCD 106 shown in FIG. 1.

The alarm screen 2200 shown in FIG. 22 is displayed superposed upon the basic macro screen 600 shown in FIG. 21, and is displayed when the "record start" key 442 is depressed on the basic macro screen 600 shown in FIG. 21. This alarm screen 2200 is displayed when the "record start" key 442 is depressed in the state that for example the macro file key 441 corresponding to the macro file 700 having the name "2 IN 1" is selected.

As a user depresses a "Yes" key 2201 on the alarm screen 2200 of FIG. 22, MFP 100 deletes the macro file 700 corresponding to the macro file key 441 from RAM 103 to start generating another macro file, whereas as the user depresses a "No" key 2202, generating another macro file is cancelled.

Figure 23:
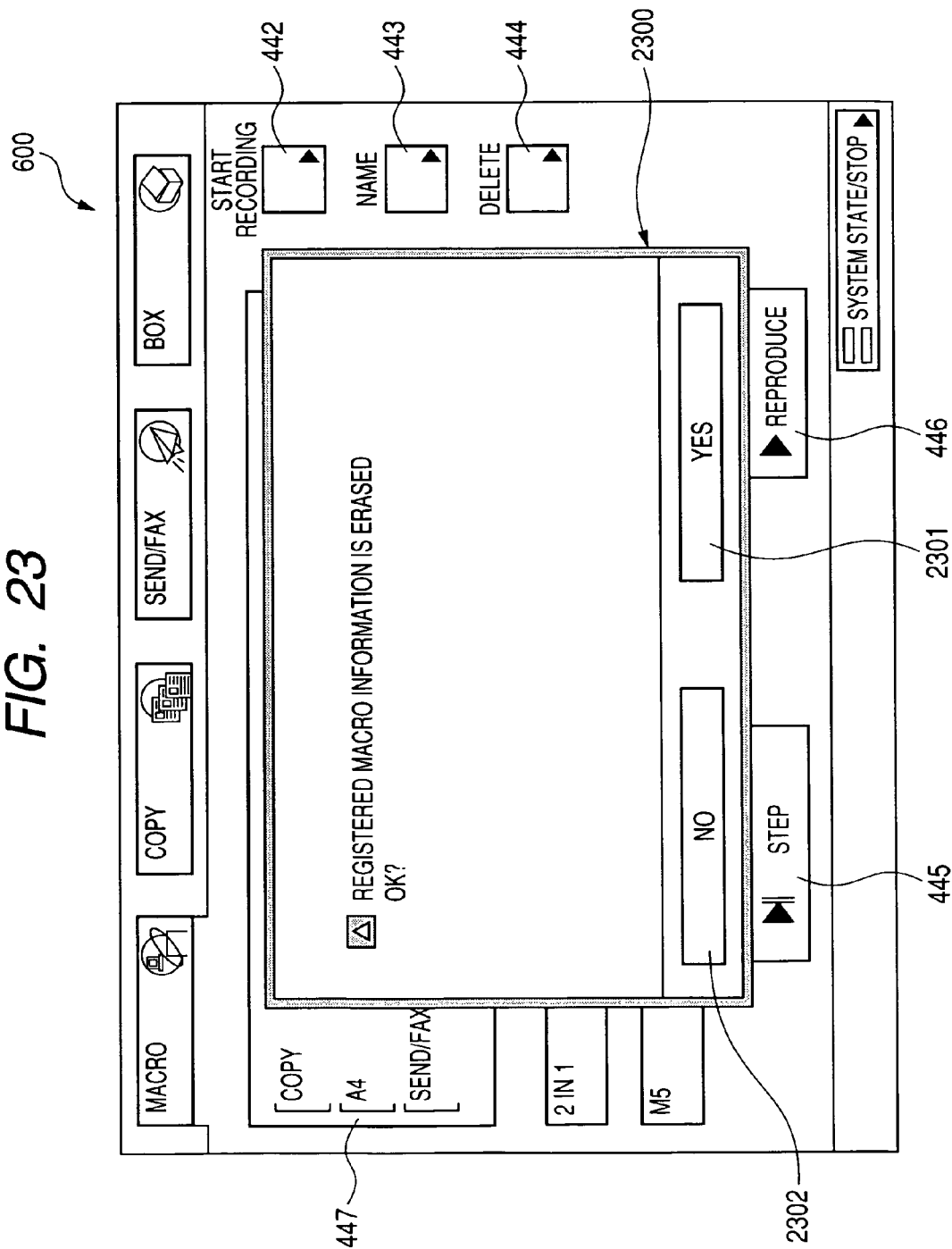
FIG. 23 is a diagram showing the structure of another example of the alarm screen to be displayed on LCD shown in FIG. 1.

FIG. 23 is a diagram showing another example of the structure of an alarm screen displayed on LCD 106 shown in FIG. 1.

The alarm screen 2300 shown in FIG. 23 is displayed superposed upon the basic macro screen 600 shown in FIG. 21, and is displayed when the "delete" key 444 is depressed on the basic macro screen 600 in the state that for example the macro file key 441 corresponding to the macro file 700 having the name "2 IN 1" is selected.

As a user depresses a "Yes" key 2301 on the alarm screen 2300 of FIG. 23, MFP 100 starts executing a delete process of deleting the macro file 700 corresponding to the macro file key 441 from the macro file key management table in RAM 103, whereas as the user depresses a "No" key 2302, starting executing the delete process is cancelled and the basic macro screen 600 shown in FIG. 21 is displayed on LCD 106.

Figure 24:
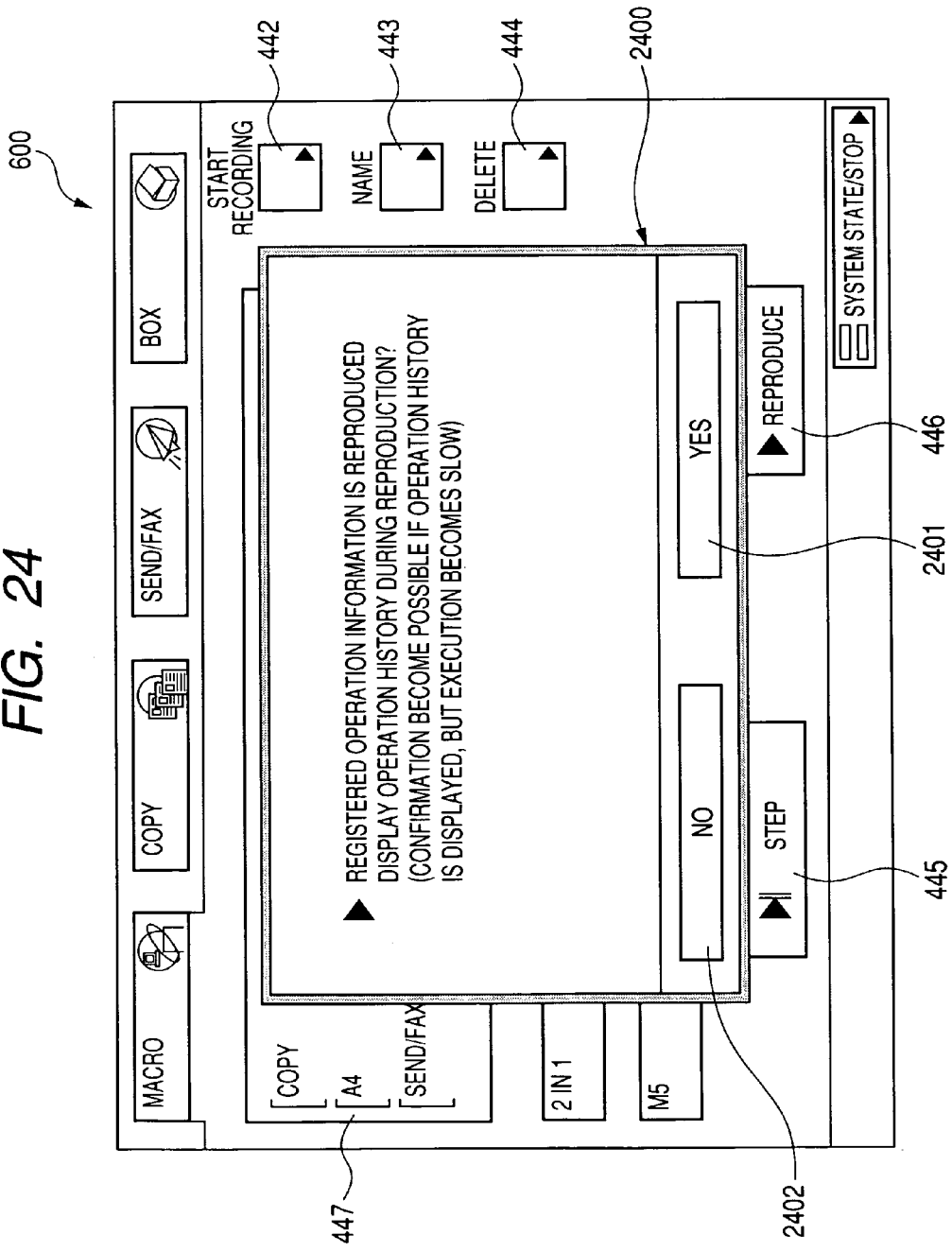
FIG. 24 is a diagram showing the structure of an example of a confirmation screen to be displayed on LCD shown in FIG. 1.

FIG. 24 is a diagram showing an example of the structure of a confirmation screen displayed on LCD 106 of FIG. 1.

The confirmation screen 2400 shown in FIG. 24 is displayed superposed upon the basic macro screen 600 of FIG. 21. This confirmation screen 2400 is displayed when the "reproduce" key 446 is depressed on the basic macro screen 600 in the state that for example the macro file key 441 corresponding to the macro file 700 having the name "2 IN 1" is selected.

Figure 25:
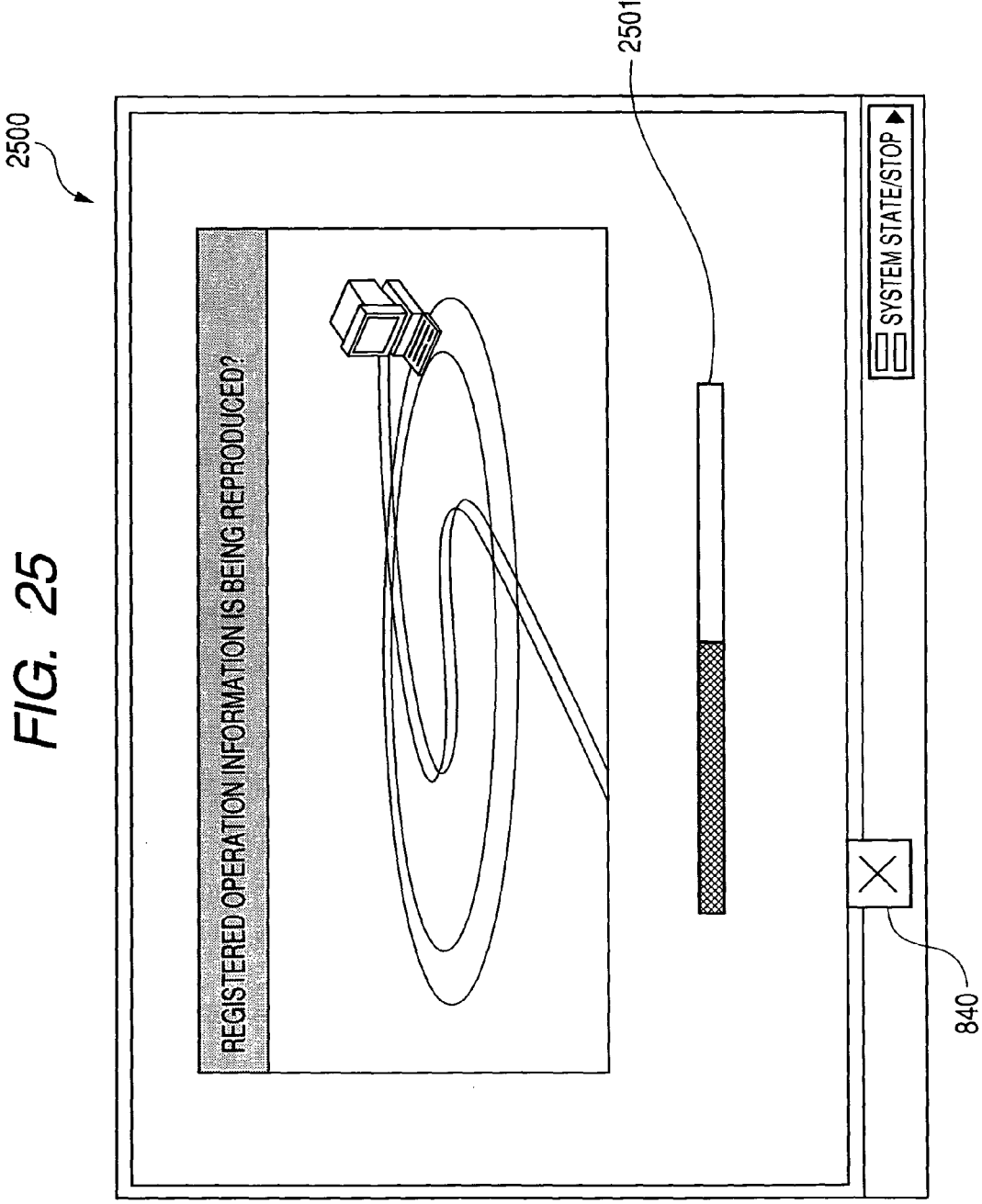
FIG. 25 is a diagram showing the structure of a reproduce start screen to be displayed on LCD shown in FIG. 1.

As a user depresses a "Yes" key 2401 on the confirmation screen 2400 of FIG. 24, MFP 100 displays the same display contents as those in the macro information display area 447 on another display apparatus (not shown) different from LCD 106 and displays a reproduce start screen 2500 of FIG. 25 on the display screen of LCD 106, whereas as the user depresses a "No" key 2402, the reproduce start screen 2500 is displayed on the display screen of LCD 106. The reproduce start screen 2500 of FIG. 25 may be displayed on the display screen of LCD 106 without displaying the confirmation screen 2400 of FIG. 24.

As shown in FIG. 25, the reproduce start screen 2500 is provided with a progress bar 2501 which displays a ratio of the number of already executed steps to the total number of all steps of the macro file 700. The cancel key 840 on the macro operation panel 800 is displayed superposed upon the reproduce start screen 2500 of FIG. 25.

Secondary, description will be made on the reproduce process which starts being executed upon depression of the "reproduce" key 446 under operation of the macro function. The reproduce process executes the same operations by reading the scripts recorded in the macro file 700 registered in the record process. In this manner, the user can reproduce the same operations by merely selecting the macro file so that the operation performance of the user can be improved.

The macro control unit 245 sequentially reads via BIOS the scripts recorded in the macro file 700.

First, the script at the first row is executed to acquire information on the function "push", function "wait", function "quit" defined in the external file.

Then, the scripts at the second to eighteenth rows are sequentially executed in accordance with the acquired information on the function "push" and function "wait" and the arguments of the functions. Since the scripts are supplied to CPU 101 without involvement of users operations of the hard keys 108 and touch panel 109, the same processes as the processes (copy job and send job) in the copy function and send/fax function executed in the record process are executed (reproduce process). If the display screen of LCD 106 changes because of execution of each script, a pose screen is displayed and thereafter the script at the next row is executed. The pose screen is the changed display screen held in this state for a predetermined time, e.g., 0.5 second. A user can therefore confirm the reproduce process of the macro process under execution. A bottom may be operated to further effect a pose (temporary stop of a macro) and if information on a numerical value of the number of copies is recorded during this pose, this change is made valid. In this case, while the registered macro is reproduced, some change may be entered.

In order to automatically operate this pose, a temporary stop time may be set to the function "wait" as an argument and a change process is performed during this period.

While the reproduce process is executed, the cancel key 840 is displayed superposed upon the display screen of LCD 106. A user can therefore recognize visually that the macro process is under execution and can cancel the macro process under execution so that the operation performance of the user can be improved. It is set that depressing a key other than the cancel key 840 is inhibited in order to permit only depression of the cancel key 840. This setting can prevent malfunction during the copy process and send/fax process in the macro process. If the pose process is to be performed by a user operation, it is obvious that a pose key is provided in addition to the cancel key 840 and operation of keys other than the pose key and cancel key are inhibited.

In the script at the sixteenth row, the function "wait" defines that after the printer 105 completes execution of the copy job, a status to the effect of execution completion of the copy job is notified to the UI frame work 241 and macro control unit 245. Upon reception of this notice, the macro control unit 245 releases the device status reception wait state on the basis of the script set to the function "wait" and executes scripts at the subsequent rows.

Thereafter, the script of the macro file 700 at the last row is executed to thereafter terminate the reproduce process. This termination of the reproduce process is notified to the macro control unit 245.

In the reproduce process, although it is set that keys other than the cancel key 840 (or also pose key) are inhibited to be depressed, it may be set that the other keys are permitted to be depressed or it may be set that the other keys are made settable to allow depression. These settings may be automatically released after execution completion of the macro process or while the pose screen is displayed during the macro process. In this manner, the operation performance of a user can be improved. In this case, the user can change settings of each process to be executed during the reproduce process. It is therefore possible to customize the macro function and improve the operation performance of a user.

More specifically, a user can depress the "group key" 1002 while the pose screen for the display screen 1000 shown in FIG. 1 superposed with the cancel key 840 is displayed by execution of the script at the fourth row. This is because the order or the like of the scripts in the macro file 700 at the fifth and following rows will not change even if the "group" key 1002 is depressed.

On the other hand, if the "staple sort" key 1003 is depressed in place of the "group" key 1002, it is necessary to insert between the scripts at the fourth and fifth rows of the macro file 700 a script for displaying on LCD 106 a setting screen for designating the stapling positions of a plurality of recording sheets discharged on a tray. In this case, the order or the like of the scripts at the fifth and following rows changes so that the subsequent scripts cannot be executed.

Figure 26:
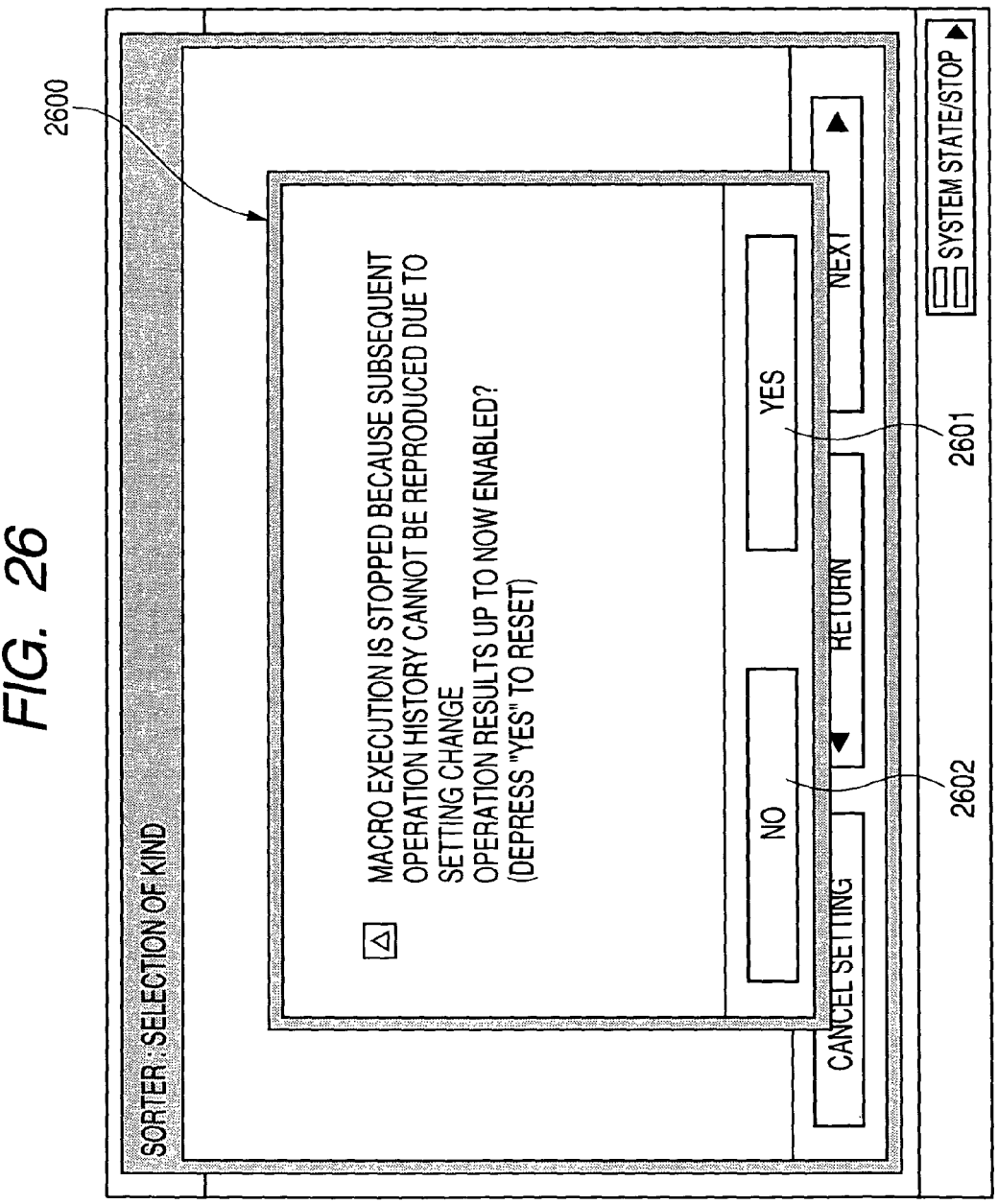
FIG. 26 is a diagram showing the structure of a confirmation pop-up screen to be displayed on LCD shown in FIG. 1.

FIG. 26 is a diagram showing a confirmation pop-up screen 2600 to be displayed on LCD 106 of FIG. 1.

The confirmation pop-up screen 2600 of FIG. 26 is displayed in a pop-up manner on LCD 106 when a key not allowing execution of scripts at subsequent rows is depressed. The confirmation pop-up screen 2600 is provided with a "Yes" key 2601 for holding settings changed upon depression of the key and cancelling execution of scripts at subsequent rows and a "No" key 2602 for resetting without holding settings changed upon depression of the key. Namely, if any of the "Yes" key 2601 and "No" key 2602 is depressed, the reproduce process of the macro process under execution is stopped and the displayed macro operation panel 800 is erased.

If the "Yes" key 2601 is depressed, the reproduce process is continuously executed in accordance with the settings made by the reproduce process until then and the settings changed upon depression of the key. If the "No" key 2602 is depressed, the settings made by the reproduce process until then and the settings changed upon depression of the key are deleted, preset default values are used and a predetermined initial screen to be displayed upon resetting is displayed on the display screen of LCD 106.

Thirdly, description will be made on the reproduce process which starts being executed upon depression of the "step" execution key 445 of FIG. 6.

Figure 27:
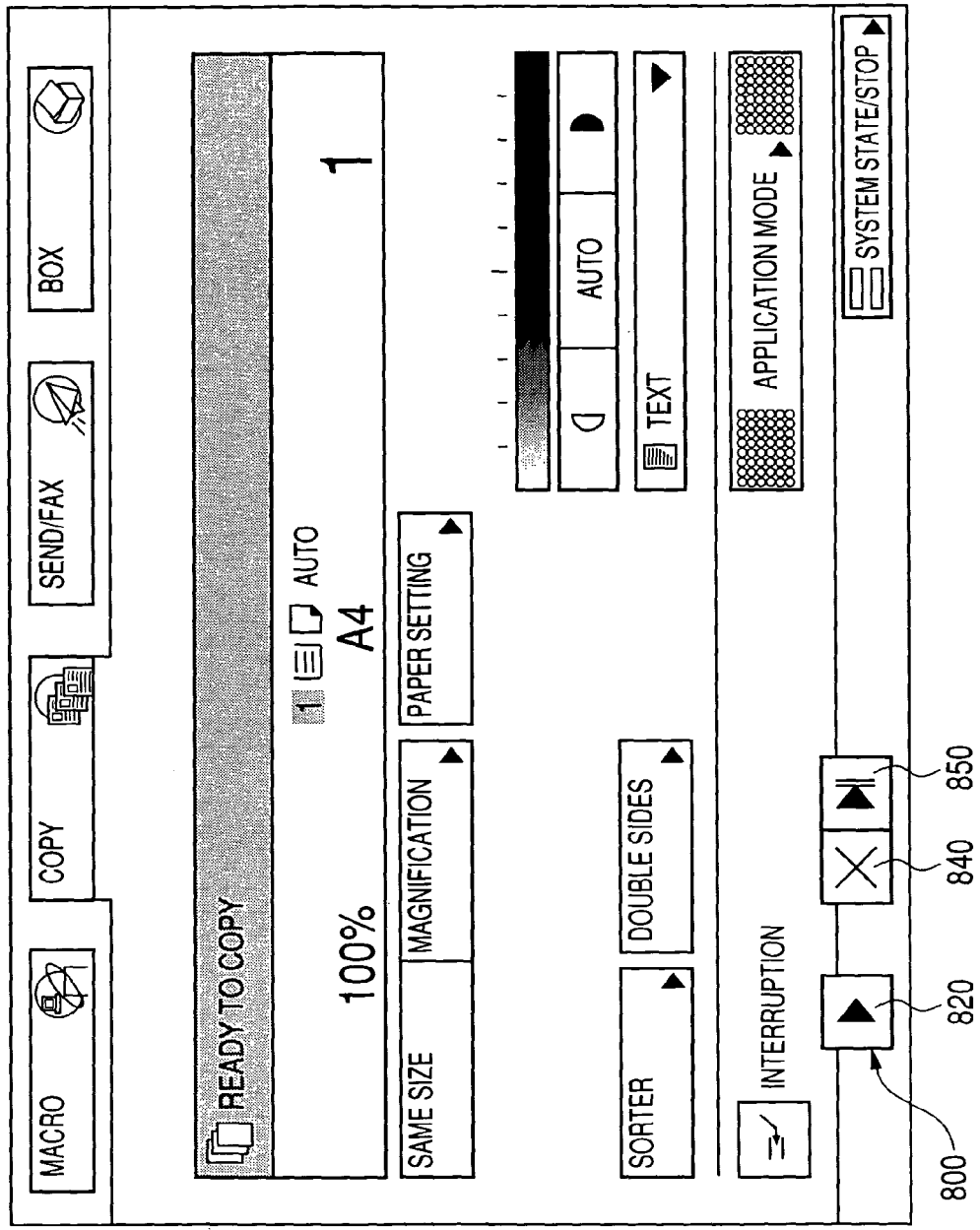
FIG. 27 is a diagram showing the structure of an example of a finishing process screen to be displayed on LCD shown in FIG. 1.

FIG. 27 is a diagram showing an example of the structure of a finishing process screen to be displayed on LCD 106 of FIG. 1.

The finishing process screen 2700 shown in FIG. 27 is displayed when the step corresponding to the script of the macro file 700 at the second row is executed upon depression of the "step" execution key 445 of FIG. 6, and the macro operation panel 800 is displayed superposed upon the finishing process screen. Each time a user depresses a "step" execution key 850 on the finishing process screen 2700 of FIG. 27, each step of the macro file 700 is sequentially executed and the pose screen is displayed in an execution state. Similar to the reproduce process upon depression of the "reproduce" key 447 described earlier, as a "reproduce" key 820 is depressed, each step of the macro file 700 is continuously executed. As a "cancel" key 840 is depressed, the reproduce process under execution is cancelled. Therefore, a user can execute the reproduce process of the macro process and cancel its execution through detailed confirmation so that the operation performance of the user can be improved.

Figure 28:
FIG. 28 is a diagram showing the structure of a modification of the macro operation panel shown in FIG. 8.

FIG. 28 is a diagram showing a modification of the macro operation panel 800 of FIG. 8.

In the macro operation panel 800 described earlier, if a predetermined device status is to be recorded in the macro file, the device status actually changed to a corresponding device status is recorded. In this modification, not an actual status but a pseudo status generated upon a key operation by a user is recorded. During the macro reproduce process, the recorded pseudo status is reproduced in correspondence with a change to an actual status.

The macro operation panel 800' shown in FIG. 28 has a "pseudo status" key 860 added to the macro operation panel 800 of FIG. 8. Other constituent elements are the same as those of the macro operation panel 800 and the description thereof is omitted.

The macro operation panel 800' is displayed on LCD 106 during the record process of the macro function. The macro operation panel may be displayed during the reproduce process if depression of a key other than the cancel key 840 (or also the pose key) is permitted.

The "pseudo status" key 860 is used for displaying a pseudo status generation screen 2900 of FIG. 29 to be described later on the display screen of LCD 106. The pseudo status generation screen is used for selecting a pseudo status not actually generated and mimicking an status actually generated.

Figure 29:
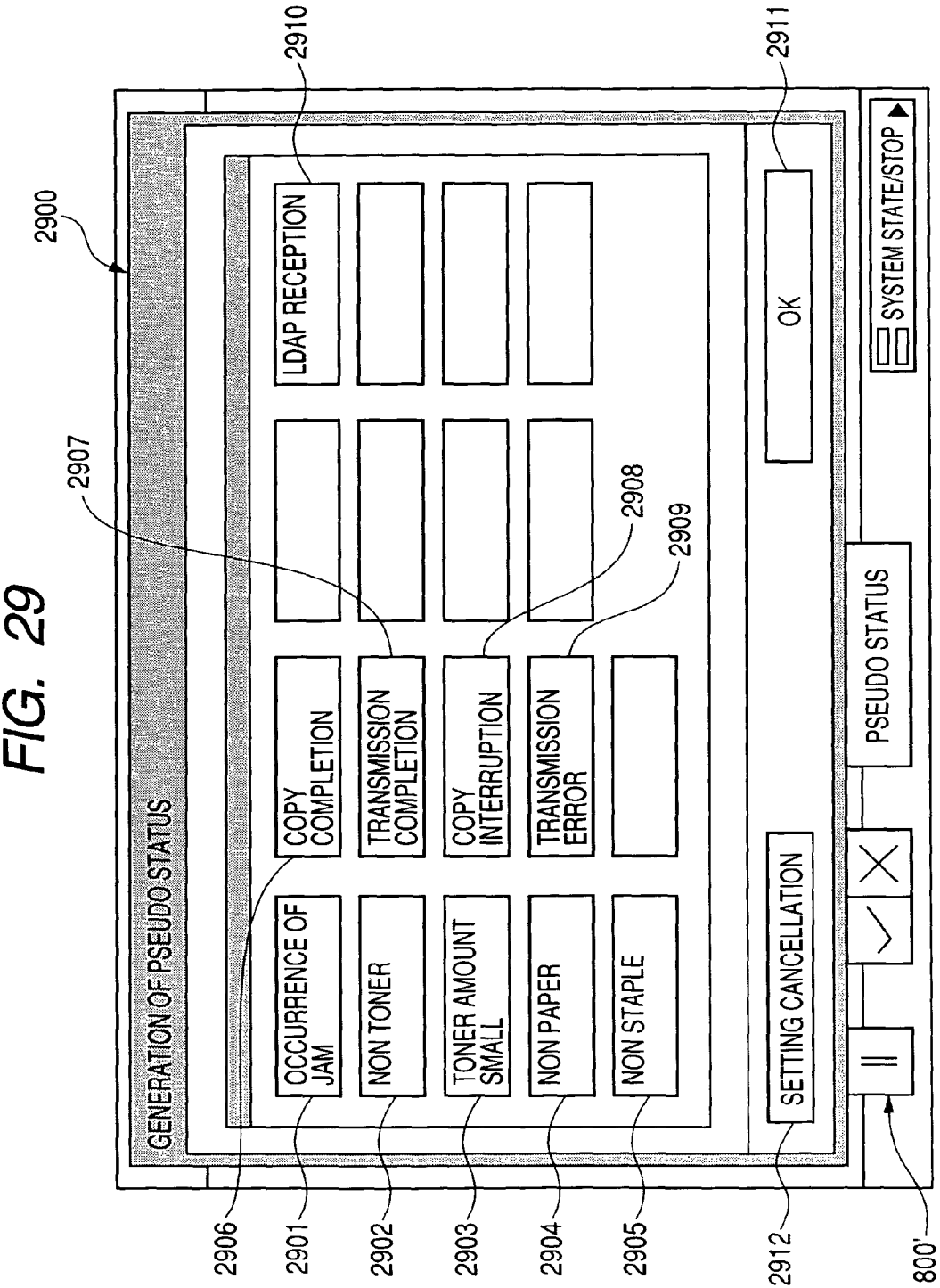
FIG. 29 is a diagram showing the structure of a pseudo status forming screen to be displayed on LCD shown in FIG. 1.

FIG. 29 is a diagram showing the structure of the pseudo status generation screen 2900 to be displayed on LCD 106 of FIG. 1.

The pseudo status generation screen 2900 shown in FIG. 29 is displayed on LCD 106 upon depression of the "pseudo status" key 860 of FIG. 28, and provided with, e.g., setting keys 2901 to 2910 corresponding to ten pseudo statuses, an "OK" key 2911 for permitting setting of a pseudo status upon depression of a corresponding setting key and a "setting cancel" key 2912 for inhibiting setting.

The ten setting keys 2901 to 2910 include: a "jam occurrence" key 2901 for mimicking a jam occurrence; a "non toner" key 2902 for mimicking no remaining amount of toner; a "small toner amount" key 2903 for mimicking a small toner amount; a "non paper" key 2904 for mimicking no recording sheet on a sheet supply tray; a "non staple" key 2905 for mimicking no stable on discharged recording sheets; a "copy completion" key 2906 for mimicking execution completion of the copy job; a "transmission completion" key 2907 for mimicking execution completion of the copy job; a "copy interruption" key 2908 for mimicking interruption of the copy job under execution; a "transmission error" key 2909 for mimicking occurrence of an error in the send job under execution for an E-mail or fax; and an "LDAP reception" key 2910 for mimicking reception of predetermined information from an external server or the like connected to MFP by using LDAP.

Of the above-described pseudo statuses, reproducing a macro file of the statuses to be acquired by user operations such as completion of the copy job and send job and reception of information by LDAP is executed in accordance with the macro reproduce instruction by the user operation as in the examples described above, and the pseudo statuses are executed in accordance with acquisition of actual statuses.

However, if occurrence of the status irrelevant to user operations or the status capable of occurring even not during the macro reproduction, is detected, a corresponding macro file may be reproduced automatically.

In the following, description will be made on a record process of the macro function for generating a macro file for transmitting an e-main to a predetermined address if a remaining toner amount becomes small.

First, a predetermined macro file key 441' on the basic macro screen 600 shown in FIG. 6 is selected and the "record start" key 442 is depressed to start generating the macro file 700'.

Next, the user displays the pseudo status generation screen 2900, selects the "small toner amount" key 2903 and depresses the "OK" key 2911. CPU 101 generates a small toner amount status as the status of the copy function unit 320, and the macro control unit 245 receives the small toner amount status and records an event of receiving the small toner amount status in the macro file 700' under generation. A display screen on LCD 106 after depression of the "OK" key 2911 is the screen corresponding to the function under execution, with the pseudo status generation screen 2900 being erased.

Figure 30:
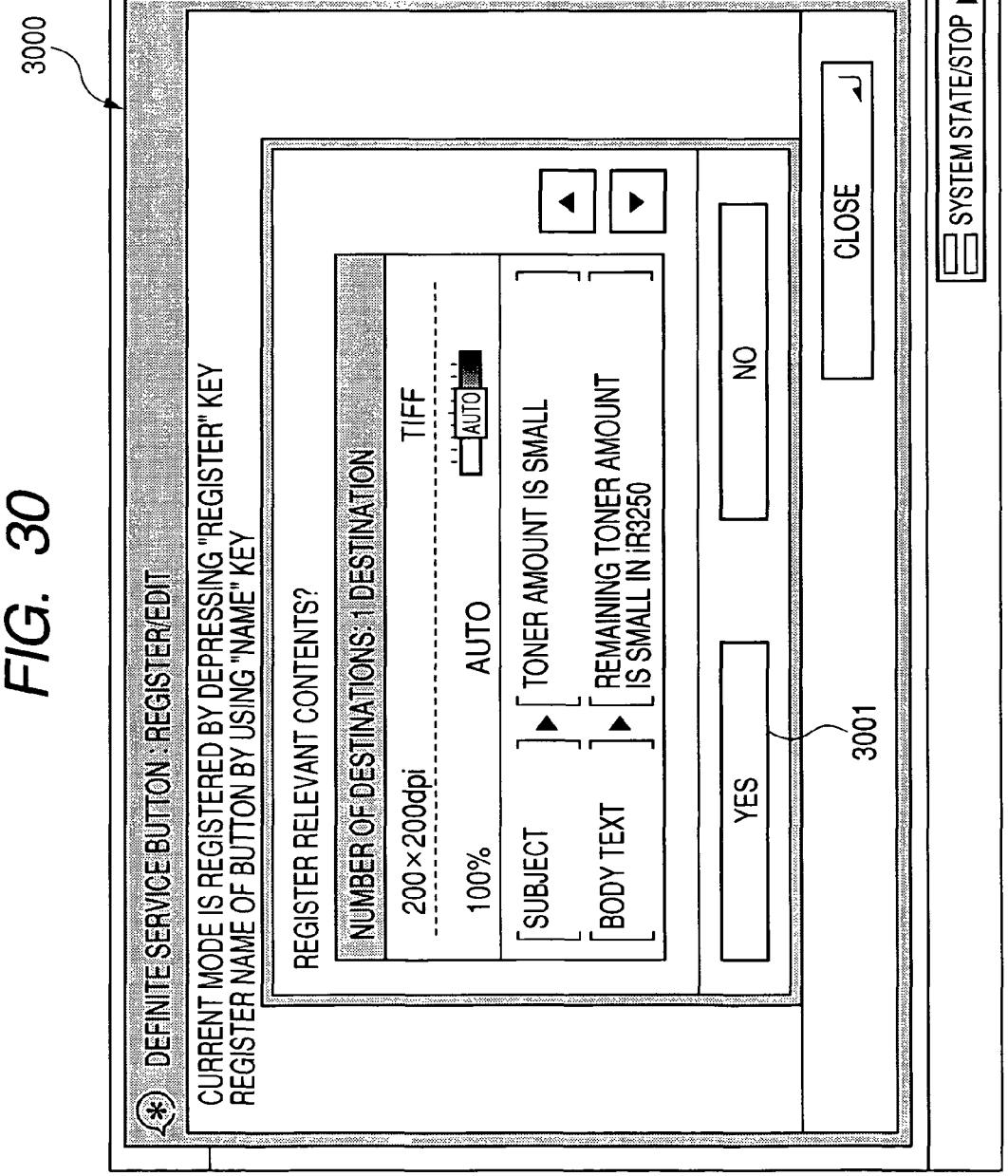
FIG. 30 is a diagram showing the structure of a definite service register/edit screen to be displayed on LCD shown in FIG. 1.

Thereafter, the user depresses the "send/fax" tab 420, and then depresses the definite service button 521 on the basic send screen 500. A definite service resister/edit screen 3000 such as shown in FIG. 30 is therefore displayed on the display screen of LCD 106. A definite service having a name "small toner amount" is selected or registered on the definite service register/edit screen 3000 and a "Yes" key 3001 is depressed to permit selection or registration of the definite service. A "small toner amount" definite service key 3101 is displayed on the basic send screen 500 of FIG. 5, as shown in FIG. 31.

Figure 31:
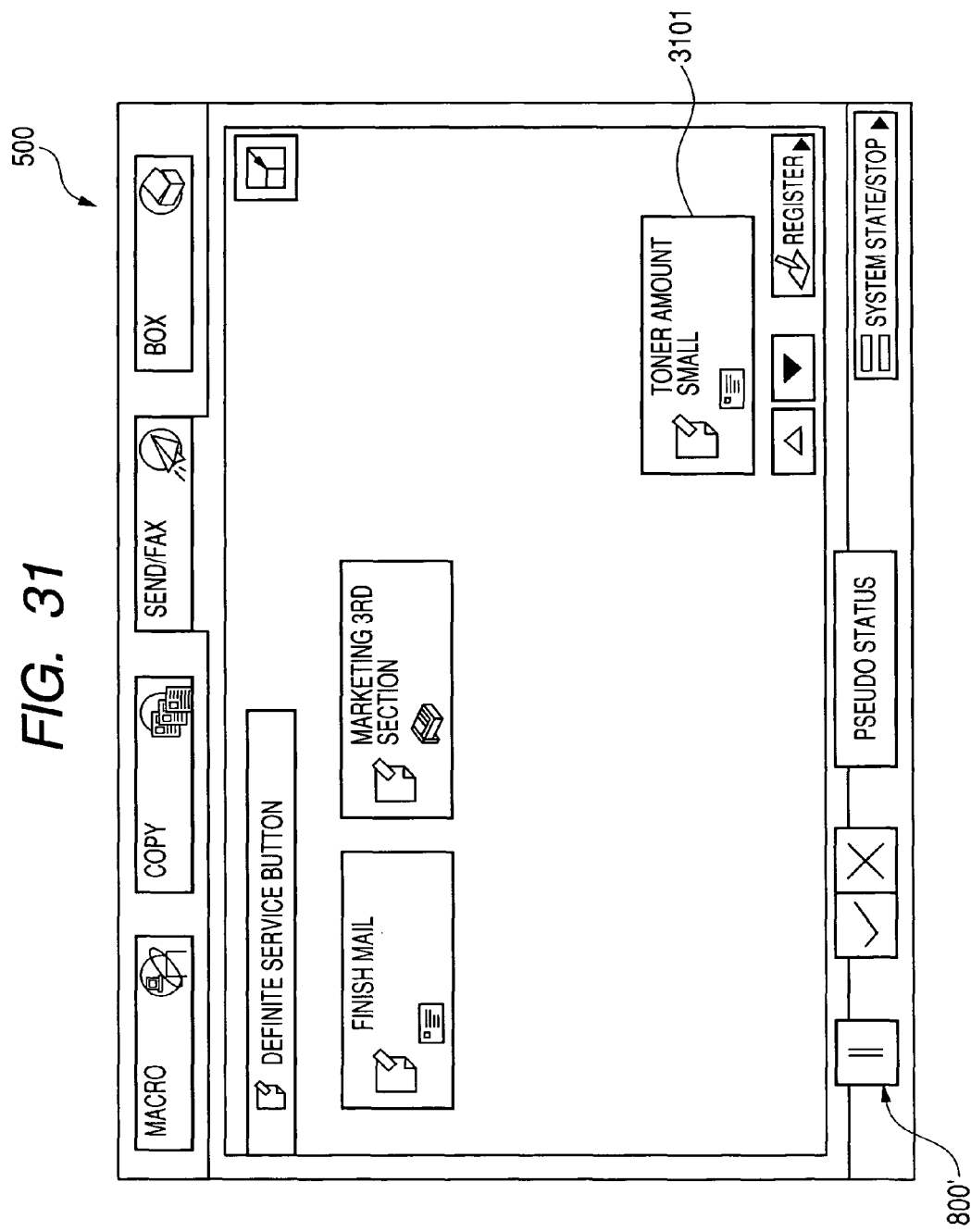
FIG. 31 is a diagram showing the basic send screen 500 shown in FIG. 5 displaying predetermined definite service keys.

The user depresses the "small toner amount" definite service key 3101 on the basic send screen 500 shown in FIG. 31, and inputs as a transmission destination address of an E-mail, for example, an E-mail address of a service section and registers "ask for a toner order" as the main text of the E-mail. In this manner, the "small toner amount" definite service key 3101 is related to information on the definite service "If the remaining toner amount of MFP 100 becomes small, ask the service section for a toner order by sending an E-mail to the service section". Thereafter, the user depresses the "small toner amount" definite service key 3101 and depresses the start key of the hard keys 108. Then, the user depresses the register key 830 on the macro operation panel 800'. In this manner, the record process is completed which forms the macro file 700' related to the definite service regarding the "small toner amount".

In the record process, a process of making the "small toner amount" definite service key 3101 relate to the information on the definite service "If the remaining toner amount of MFP 100 becomes small, ask the service section for a toner order by sending an E-mail to the service section", is recorded in the macro file 700'. Instead, the "small toner amount" definite service key 3101 may be displayed beforehand on the basic send screen 500 and a macro file 700" may be formed upon depression of the record start key 442. In this case, the number of steps to be recorded in the macro file 700" can be made smaller than that for the macro file 700'.

FIG. 32 is a diagram showing that a macro file key 441' related to the "small toner amount" key 3101 of FIG. 31 is selected on the basic macro screen 600 of FIG. 6.

In the basic macro screen 600 of FIG. 32, as schematically shown in a macro information display area 447, the macro file 700" corresponding to the macro file key 441' having a name "inform small toner amount" is mainly constituted of a step of receiving a small toner amount status, a step of changing to the send/fax function, a step of selecting the "small toner amount" definite service key 3101 and a step of depressing the start key of the hard keys 108.

If the remaining toner amount becomes actually small, CPU 101 generates a small toner amount status, the touch panel 108 as the operation unit receives the status and notifies reception of the small toner amount status to the macro function unit 340. First, the macro function unit 340 judges whether or not any one of a plurality of macro files registered in RAM 103 is under reproduction. If not, it is judged whether there is a macro file starting with reception of the device status among the plurality of registered macro files. If there is the macro file starting with reception of the device status, it is judged whether the device status is the small toner amount status. In this case, since the macro file 700" starting with reception of the small toner amount status is registered in RAM 103, MFP 100 automatically starts the reproduce process of the macro process in accordance with the macro file 700".

In the above-described embodiment, although the macro control unit 245 manages pairs of user operations and events generated by user operations, the macro control unit is not required to manage events generated by all user operations, but the macro control unit may manage only necessary events. For example, a script for waiting release of a jam may not be generated which is an event generated when a jam occurred, or it may be structured that a user confirms whether the jam release wait script is generated.

It can be considered that the status capable of being recorded in the macro file is detected during the record process of the macro file. In this case, information on the status may be recorded in the macro file presently recorded. When a status capable of being recorded in the macro file is detected during macro recording, whether the status is recorded in the macro file is displayed on LCD 106 to make a user to judge. Similarly, when a status capable of being recorded in the macro file is detected during macro recording, it is judged whether there is no contradiction between a sequence of macros presently recorded and the detected status. In accordance with this judgment, whether status is recorded or not may be determined. If the status is not recorded in the macro file, the above-described macro auto reproduce process is executed.

In the above embodiment, although MFP 100 records and reproduces a macro file, the embodiment is not limited thereto, but a macro file may be recorded and reproduced in accordance with the operation sequence on the side of MFP 100 by connecting a personal computer or the like to the external of MFP 100.

According to the embodiment, macros are recorded and reproduced through depression of buttons and simple scripts of recording a small number of events so that the macro program can be made very simple.

A macro file generated by MFP 100 may be transferred to another apparatus which reproduces it by a similar operation sequence.

The operation sequence may by a manual operation sequence or other operation methods such as using voice recognition functions.

According to the embodiment, the macro function records an operation sequence and information on a status generated asynchronously, and the operation sequence is reproduced in accordance with the record order. Therefore, the macro function can be operated reliably even a sequence having an event generated asynchronously with a user operation is used.

The image processing apparatus according to the embodiment of the present invention is not limited only to MFP 100 but the embodiment is applicable to other image processing apparatuses having the macro function. In addition to the image processing apparatus processing image data, the embodiment is also applicable to various apparatuses which can adopt the macro function.

It is obvious that the objects of the invention can be achieved by supplying a system or an apparatus with a storage medium (recording medium) storing software program codes realizing the function of the embodiment and making a computer (CPU or MPU) of the system or apparatus read and execute the program codes stored in the storage medium.

In this case, the program codes themselves read from the storage medium realize the embodiment function. Therefore, the program codes themselves constitute the present invention.

It is obvious that the invention includes the cases wherein not only the computer executes the read program codes to realize the embodiment function but also an operating system (OS) or the like running on a computer performs a portion or the whole of actual processes in accordance with instructions of the program codes to realize the embodiment function.

It is obvious that the scope of the invention also contains the case wherein the functions of the embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

The program may be object codes, a program to be executed by an interpreter, script data supplied to OS or the like, if a computer can realize the embodiment function.

The recording medium for storing a program may be a RAM, an NV-RAM, a floppy disk (registered trademark), an optical disk, a magneto optical disk, a CD-ROM, an MO, a CD-R, a CD-RW, a DVD (DVD-ROM, DVD-RAM, DVD-RW, DVD+RW), a magnetic tape, a nonvolatile memory card, a ROM or the like, if it can store the program. Alternatively, the program may be supplied by downloading it from unrepresented other computers and databases connected to the Internet, a commercial network, a local area network or the like.

The present invention has been described in connection with the preferred embodiment. The invention is not limited to the embodiment, but various modifications are possible without departing from the scope of claims.

This application claims priority from Japanese Patent Application No. 2004-248665 filed on Aug. 27, 2004, which is hereby incorporated by reference herein.

What is claimed is:

1. An image processing apparatus comprising:
an operation unit configured to receive a first operation from a user and a second operation from the user following the first operation;
a memory;
a processor programmed to provide:
an operation recording instruction that records the first and second operations received by the operation unit in the memory;

a status recording instruction that records a status, corresponding to the first operation recorded by the operation recording instruction, appearing before the operation unit receives the second operation, in the memory; and a reproducing instruction that reproduces the first and second operations recorded by the operation recording instruction in order of the operations received by the operation unit, wherein the recorded second operation is reproduced after the status recorded in the status recording instruction appears, after the recorded first operation is reproduced by the reproducing instruction.

2. A data processing apparatus according to claim 1, wherein the status includes a response to the recorded operation.

3. A data processing apparatus according to claim 1, wherein:

the operation unit includes a display unit that displays predetermined information, the display unit displays transition of display contents in accordance with the reproduced operation, and the reproducing instruction reproduces the transition of the display contents.

4. A data processing apparatus according to claim 1, wherein:

the processor is further programmed to provide a temporarily stop instruction that temporarily stops reproduction during the reproduction instruction, and an operation other than the recorded operation is operable via the operation unit during the temporary stop instruction.

5. A data processing apparatus according to claim 1, wherein the processor is further programmed to provide a generating instruction that generates a status.

6. A data processing apparatus according to claim 1, wherein the processor is further programmed to provide a selecting instruction that selects whether the status recording instruction records the status when a predetermined status is detected.

7. An image processing apparatus according to claim 1, wherein the operation recording instruction records a plurality of operations, including the first and second operations.

8. An image processing apparatus according to claim 1, wherein the status recorded by the status recording instruction is paired with the first operation recorded by the operation recording instruction.

9. A control method for an image processing apparatus having an operation unit that receives operations from a user, and a memory, the method comprising:

an operation receiving step of receiving a first operation from the user and a second operation from the user following the first operation with the operation unit;

an operation recording step of recording the first and second operations received in the operation receiving step in the memory;

a status recording step of recording a status, corresponding to the first operation recorded in the operation recording step, appearing before the operation recording instruction receives the second operation, in the memory;

a reproducing step of reproducing the first and second operations recorded in the operation recording step in order of the operations received in the operation receiving step, wherein the recorded second operation is reproduced after the status recorded in the status recording step appears, after the recorded first operation is reproduced in the reproducing step.

10. A non-transitory computer readable recording medium storing a program that executes a method of controlling an image processing apparatus having an operation unit and a memory, the method comprising:

an operation receiving step receiving a first operation from the user and a second operation from the user following the first operation with the operation unit;

an operation recording step of recording the first and second operations received in the operation receiving step in the memory;

a status recording step of recording a status, corresponding to the first operation recorded in the operation recording step, appearing before the operation recording instruction receives the second operation, in the memory; and a reproducing step of reproducing the first and second operations recorded in the operation recording step in order of the operations received in the operation receiving step, wherein the recorded second operation is reproduced after the status recorded in the status recording step appears, after the recorded first operation is reproduced in the reproducing step.

* * * * *